United States Patent
Cho et al.

(10) Patent No.: US 10,418,920 B2
(45) Date of Patent: *Sep. 17, 2019

(54) POWER SYSTEM AND MOTOR DRIVING APPARATUS INCLUDED IN POWER SYSTEM

(71) Applicant: Samsung Electronics Co., Ltd, Suwon-si, Gyeonggi-do (KR)

(72) Inventors: Je Hyung Cho, Seoul (KR); Alexey Bodrov, Suwon-si (KR); Sun Jin Kim, Suwon-si (KR); Yong Woon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,248

(22) Filed: Mar. 22, 2018

(65) Prior Publication Data

US 2018/0269811 A1   Sep. 20, 2018

Related U.S. Application Data

(63) Continuation of application No. 15/118,463, filed as application No. PCT/KR2015/001247 on Feb. 6, 2015, now Pat. No. 9,966,880.

(30) Foreign Application Priority Data

Feb. 11, 2014   (KR) .................. 10-2014-0015703

(51) Int. Cl.
*H02P 1/54*   (2006.01)
*H02P 5/48*   (2016.01)
(Continued)

(52) U.S. Cl.
CPC .................. *H02P 5/48* (2013.01); *H02P 5/46* (2013.01); *H02P 5/74* (2013.01); *H02P 21/22* (2016.02); *H02P 27/08* (2013.01)

(58) Field of Classification Search
CPC ............. H02P 21/22; H02P 5/74; H02P 21/18
See application file for complete search history.

(56) References Cited

U.S. PATENT DOCUMENTS 6,043,617 A   3/2000  Matsumoto et al.
9,670,933 B2*  6/2017  Yoo ........................ F04D 27/005

FOREIGN PATENT DOCUMENTS

| CN | 203086393 U | 7/2013 |
|----|-------------|--------|
| JP | 2003-116293 A | 4/2003 |
| JP | 2008-141824 A | 6/2008 |

OTHER PUBLICATIONS

The State Intellectual Property Office of the P.R. China, "The First Office Action," Application No. CN 201580008213.1, dated May 3, 2018, 19 pages.

(Continued)

*Primary Examiner* — Karen Masih

(57) ABSTRACT

A power system may include a first motor, a second motor connected in parallel to the first motor, a driver configured to supply a driving current to the first motor and the second motor and a controller configured to control the driver based on the driving current and a rotating speed of the first motor, and when the rotating speed of the first motor is different from a rotating speed of the second motor, the controller may control the driver so that the rotating speed of the first motor is equal to the rotating speed of the second motor. The power system may drive two and more motors at the same speed by applying the driving voltage based on the rotating speed and the driving current of one of two or more motors, using a single driving apparatus.

13 Claims, 28 Drawing Sheets

(51) Int. Cl.
  *H02P 5/46*    (2006.01)
  *H02P 5/74*    (2006.01)
  *H02P 21/22*   (2016.01)
  *H02P 27/08*   (2006.01)

(56) References Cited

OTHER PUBLICATIONS

Bidart, Damien, et al., "Mono inverter dual parallel PMSM—Structure and Control strategy," 2008 34th Annual Conference of IEEE Industrial Electronics, IEEE, 2008, 6 pages.
Nguyen, Ngoc Linh, et al., "Predictive Torque Control—A Solution for Mono Inverter-Dual Parallel PMSM System," 2011 IEEE International Symposium on Industrial Electronics, IEEE, 2011, 6 pages.
China National Intellectual Property Administration, "Notification of Due Registration Formalities," Application No. CN201580008213.1, Apr. 3, 2019, 4 pages.

\* cited by examiner

POWER SYSTEM AND MOTOR DRIVING APPARATUS INCLUDED IN POWER SYSTEM

CROSS-REFERENCE TO RELATED APPLICATIONS AND CLAIM OF PRIORITY

This application is a continuation of application Ser. No. 15/118,463, which is the National Stage of International Application No. PCT/KR2015/001247, filed Feb. 6, 2015, which claims foreign priority to Korean Patent Application No. KR 10-2014-0015703, filed Feb. 11, 2014, the disclosures of which are herein incorporated by reference in their entirety.

TECHNICAL FIELD

Embodiments of the present disclosure relate to a power system and a motor driving apparatus included in the power system, and more particularly, to a power system configured to drive a plurality of motors at the same time and a motor driving apparatus included in the power system.

BACKGROUND

Motors are widely used not only in home appliances such as washing machines, refrigerators, air-conditioners and vacuum cleaners, but also in electric vehicles and hybrid vehicles, which have recently been receiving attention.

Among them, a permanent magnet motor using a permanent magnet rotates a rotor using a magnetic interaction between a magnetic field of a coil through which an electric current flows and a magnetic field of the permanent magnet.

To drive the permanent magnet motor, a driving apparatus, such as an inverter, which is capable of applying a driving voltage is required. Since the magnetic field generated by the rotor of the permanent magnet motor is determined depending on a location of the rotor, the inverter should apply the driving voltage in consideration of the location of the rotor.

Eventually, in the driving voltage, a phase of the driving voltage is changed according to a rotating speed of the permanent magnet motor, an output torque and the location of the rotor.

As described above, to control the permanent magnet motor, the inverter should apply the driving voltage which is changed according to the rotating speed of the permanent magnet motor, the output torque and the location of the rotor. Therefore, to control two or more permanent magnet motors, two or more inverters that control the motors, respectively, are required.

SUMMARY

Therefore, it is an aspect of the present disclosure to provide a power system capable of controlling two or more motors using a single inverter, and a motor driving apparatus included in the power system.

It is another aspect of the present disclosure to provide a power system capable of minimizing the number of sensor configured to detect a motion of two or more motors, when controlling two or more motors using a single inverter, and a motor driving apparatus included in the power system.

Therefore, it is an aspect of the present disclosure to provide a power system capable of controlling two or more motors using a single inverter, and a motor driving apparatus included in the power system.

In accordance with an aspect of the present disclosure, a power system may include a first motor, a second motor connected in parallel to the first motor, a driver configured to supply a driving current to the first motor and the second motor and a controller configured to control the driver based on the driving current and a rotating speed of the first motor, and when the rotating speed of the first motor is different from a rotating speed of the second motor, the controller may control the driver so that the rotating speed of the first motor is equal to the rotating speed of the second motor.

When the rotating speed of the first motor is different from the rotating speed of the second motor, the controller may control the driver based on the rotating speed of the first motor and a difference between the rotating speed of the first motor and the rotating speed of the second motor.

The power system may further include a first current detector configured to detect the driving current of the first motor.

The power system may further include a total current detector configured to detect a total driving current that is supplied by the driver and a second current detector configured to detect a driving current of the second motor, and the controller may estimate the driving current of the first motor based on the driving current of the second motor and the total driving current.

The controller may estimate the rotating speed of the first motor based on the driving current of the first motor.

The power system may further include a first position detector configured to detect a position of a rotor of the first motor, and the controller may estimate the rotating speed of the first motor based on the position of the rotor of the first motor.

The power system may further include a second position detector configured to detect a position of a rotor of the second motor, and the controller may estimate the rotating speed of the second motor based on the position of the rotor of the second motor.

The power system may further include a second current detector configured to detect the driving current of the second motor, and the controller may estimate the rotating speed of the second motor based on the driving current of the second motor.

The power system may further include a total current detector configured to detect a total driving current that is supplied by the driver, and the controller may estimate the rotating speed of the second motor based on the driving current of the first motor and the total driving current.

In accordance with an aspect of the present disclosure, a motor driving apparatus may include a driver configured to supply a driving current to a first motor and a second motor connected in parallel to each other and a controller configured to control the driver based on the driving current and a rotating speed of the first motor, and when the rotating speed of the first motor is different from a rotating speed of the second motor, the controller controls the driver based on the rotating speed of the first motor and a difference between the rotating speed of the first motor and the rotating speed of the second motor so that the rotating speed of the first motor is equal to the rotating speed of the second motor.

The motor driving apparatus may further include a first current detector configured to detect the driving current of the first motor.

The motor driving apparatus may further include a total current detector configured to detect a total driving current that is supplied by the driver and a second current detector configured to detect a driving current of the second motor, and the controller may estimate the driving current of the first motor based on the driving current of the second motor and the total driving current.

The controller may estimate the rotating speed of the first motor based on the driving current of the first motor.

If the first motor includes a first position detector configured to detect a position of a rotor of the first motor, the controller may estimate the rotating speed of the first motor based on the position of the rotor of the first motor detected by the first position detector.

If the second motor includes a second position detector configured to detect a position of a rotor of the second motor, the controller may estimate the rotating speed of the second motor based on the position of the rotor of the second motor detected by the second position detector.

The motor driving apparatus may further include a second current detector configured to detect the driving current of the second motor, and the controller may estimate the rotating speed of the second motor based on the driving current of the second motor.

The motor driving apparatus may further include a total current detector configured to detect a total driving current that is supplied by the driver, and the controller may estimate the rotating speed of the second motor based on the driving current of the first motor and the total driving current.

In accordance with one aspect of the present disclosure, it may be possible to drive two and more motors at the same speed by applying the driving voltage based on the rotating speed and the driving current of one of two or more motors, using a single driving apparatus.

In accordance with another aspect of the present disclosure, when driving two and more motors using a single inverter, it may be possible to drive two and more motors such that any one motor requires a current sensor and the other motor is operated without a current sensor.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
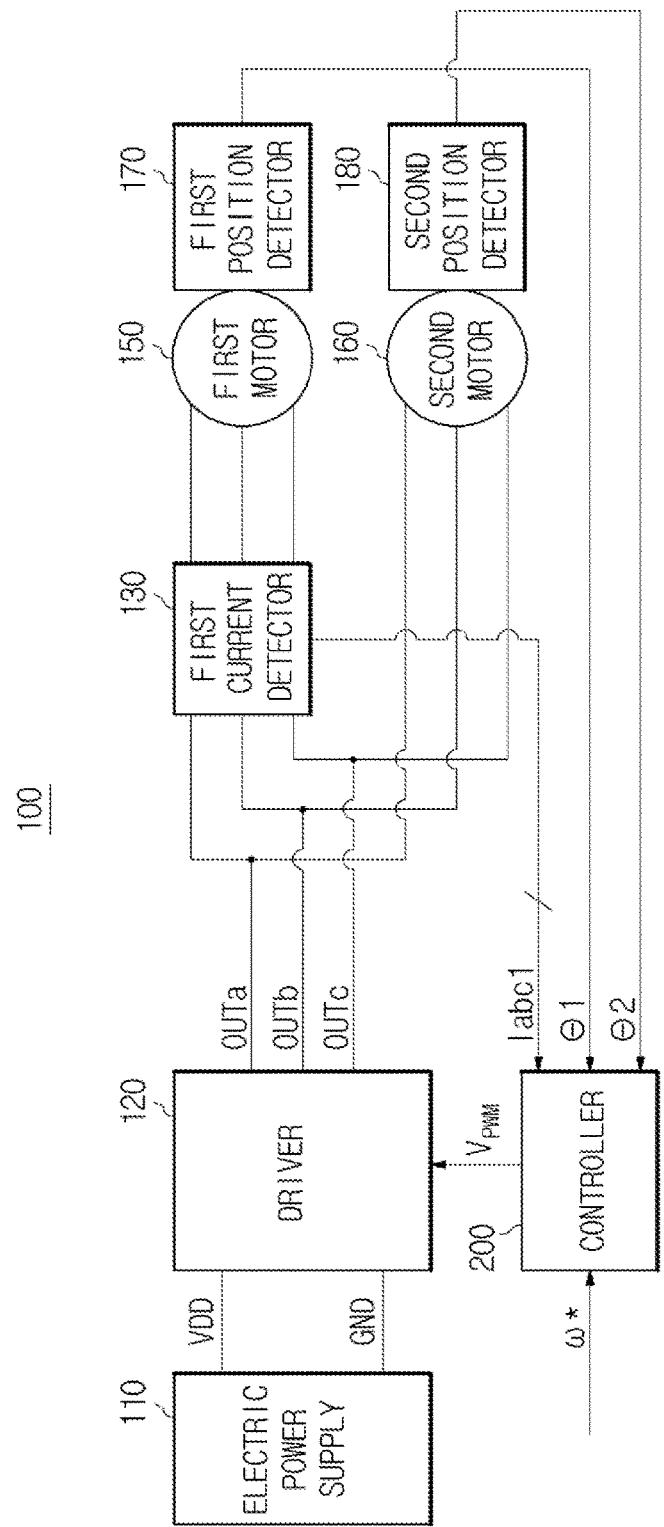
FIG. 1 is a view illustrating a power system according to an embodiment.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

Parts which are not associated with the description are omitted in order to specifically describe the present disclosure, and like reference numerals refer to like elements throughout the specification It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a power system and a motor driving apparatus included in the power system according to an embodiment of the present disclosure will be described in detail with reference to the accompanying drawings.

Figure 2:
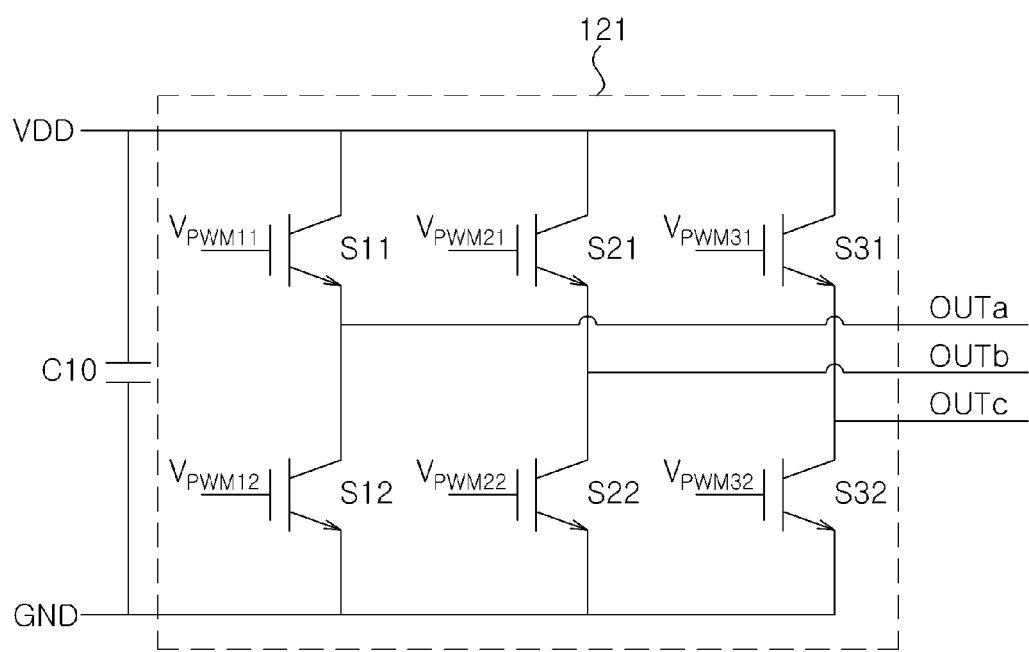
FIG. 2 is a view illustrating an example of a driver included in the power system according to an embodiment.
Figure 3:
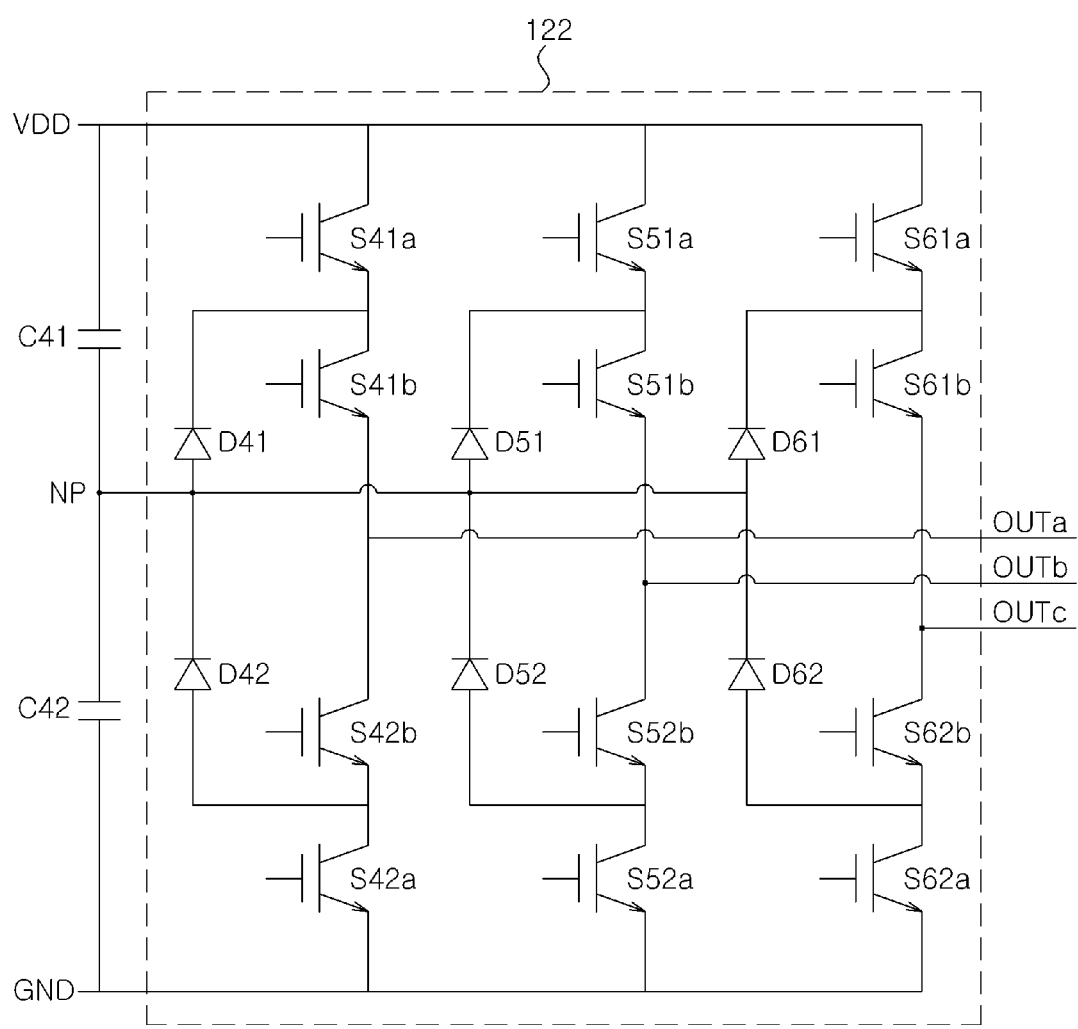
FIG. 3 is a view illustrating another example of a driver included in the power system according to an embodiment.

FIG. 1 is a view illustrating a power system according to an embodiment. FIG. 2 is a view illustrating an example of a driver included in the power system according to an embodiment of the present disclosure, FIG. 3 is a view illustrating another example of a driver included in the power system according to an embodiment of the present disclosure, and FIG. 4 is a view illustrating another example of a driver included in the power system according to an embodiment of the present disclosure.

Figure 4:
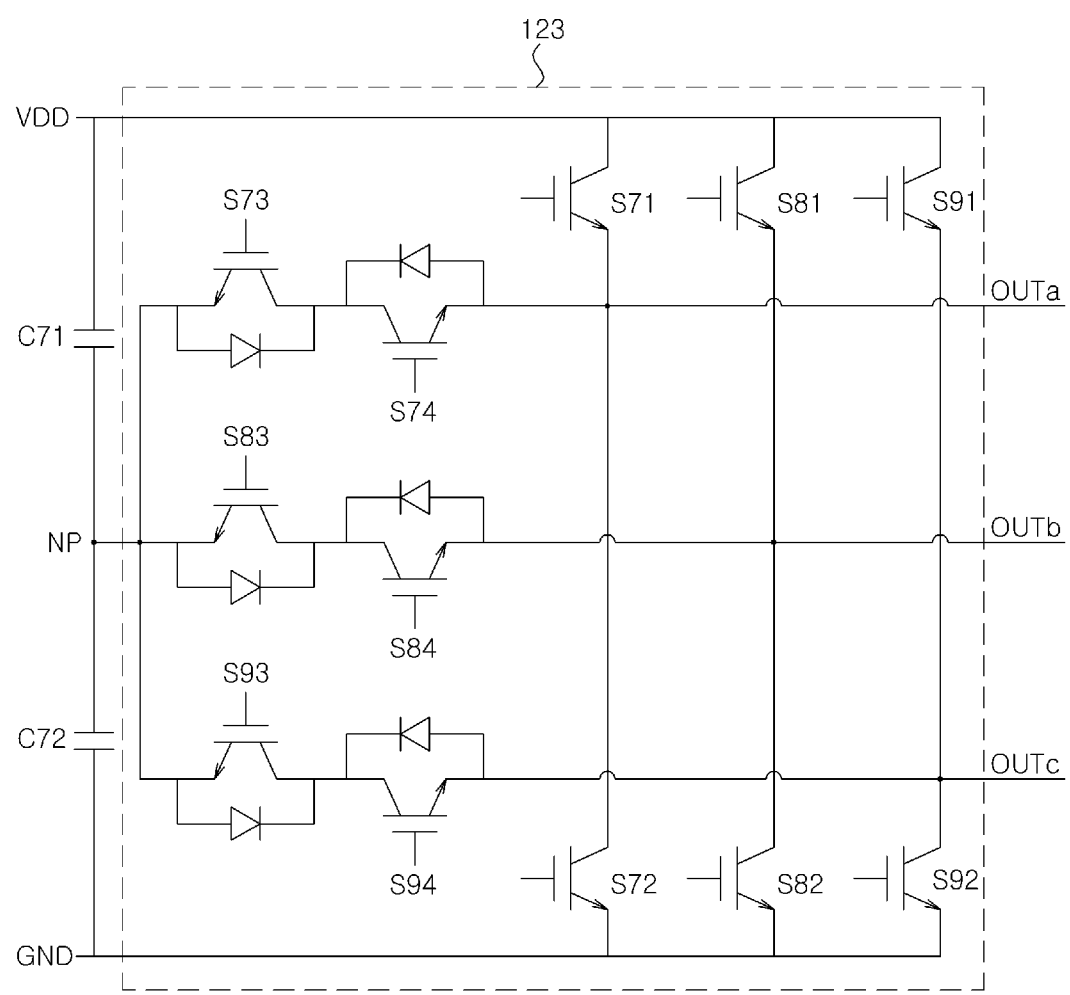
FIG. 4 is a view illustrating another example of a driver included in the power system according to an embodiment.

As illustrated in FIGS. 1 and 4, according to an embodiment, the power system 100 may include an electric power supply 110, a driver 120, a first motor 150, a second motor 160, a first current detector 130, a first position detector 170, a second position detector 180 and a controller 200. The power system 100 may receive electric energy from an outside and convert the electric energy into kinetic energy.

The electric power supply 110 may supply DC power to the driver 120. For example, when the power system 100 receives AC power from an external power source, the electric power supply 110 may include a rectifier circuit such as a diode bridge, and a smoothing circuit such as a capacitor. In addition, the electric power supply 110 may selectively further include a power factor correction (PFC) circuit which improves a power factor of input power, and a DC-DC converter which converts a voltage of the DC power rectified by the rectifier circuit.

As another example, when the power system 100 receives DC power from the external power source, the electric power supply 110 may include a DC-DC converter which converts a voltage of the supplied DC power.

The driver 120 may supply a driving current to the first and second motors 150 and 160 using the DC power received from the electric power supply 110. Particularly, the driver 120 may open and close a plurality of switching circuits disposed between the electric power supply 110 and the first and second motors 150 and 160 according to control signals (Vpwm) generated from the controller 200, and thus apply a proper driving voltage to the first and second motors 150 and 160. At this time, a driving current may be supplied to the first and second motors 150 and 160 according to the applied driving voltage.

For example, the driver 120 may include a 6 switch inverter 121.

When the driver 120 includes the 6 switch inverter 121, the smoothing circuit may include a capacitor (C 10) and the DC power (VDD) and a ground (GND) may be formed on both ends of the capacitor (C 10), as illustrated in FIG. 2.

Referring to FIG. 2, the 6 switch inverter 121 may include an a-phase output terminal (OUTa), a b-phase output terminal (OUTb) and a c-phase output terminal (OUTc), and the three output terminals (OUTa, OUTb and OUTc) may be connected to an a, b, and a c-phase input terminal of the first and second motors 150 and 160, respectively.

Three upper switching circuits (S11, S21 and S31) may be provided between the three output terminals (OUTa, OUTb and OUTc) and the DC power (VDD), and three lower switching circuits (S12, S22 and S32) may be provided between the three output terminals (OUTa, OUTb and OUTc) and the ground (GND).

In addition, the three upper switching circuits (S11, S21 and S31) and the three lower switching circuits (S12, S22 and S32) may be opened and closed by receiving the control signals (Vpwm), i.e., Vpwm11, Vpwm12, Vpwm21, Vpwm22, Vpwm31, and Vpwm32, generated by the controller 200.

As another example, the driver 120 may include a diode clamped inverter 122.

When the driver 120 includes the diode clamped inverter 122, the smoothing circuit may include a pair of capacitor (C41 and C42) connected in series, as illustrated in FIG. 3. In addition, the DC power (VDD) and a ground (GND) may be formed on both ends of the pair of capacitor (C41 and C42), and a neutral point (NP) having a voltage of VDD/2 may be formed on a node in which of the pair of capacitor (C41 and C42) are connected.

The diode clamped inverter 122 may include an a-phase output terminal (OUTa), a b-phase output terminal (OUTb) and a c-phase output terminal (OUTc) and the three output terminals (OUTa, OUTb and OUTc) may be connected to an a, b and a c-phase input terminals of the first and second motors 150 and 160, respectively.

Three pairs of upper switching circuits (S41a and S41b, S51a and S51b, and S61a and S61b) may be provided between the three output terminals (OUTa, OUTb and OUTc) and the DC power (VDD), and three pairs of lower switching circuits (S42a and S42b, S52a and S52b, and S62a and S62b) may be provided between the three output terminals (OUTa, OUTb and OUTc) and the ground (GND).

Three upper diodes (D41, D51, and D61) may be provided a node in which the three pairs of upper switching circuits (S41a and S41b, S51a and S51b, and S61a and S61b) are connected to each other and a NP, and three lower diodes (D42, D52, and D62) may be provided a node in which the three pairs of lower switching circuits (S42a and S42b, S52a and S52b, and S62a and S62b) are connected to each other and a NP.

The three pairs of upper switching circuits (S41a and S41b, S51a and S51b, and S61a and S61b) and the three pairs of lower switching circuits (S42a and S42b, S52a and S52b, and S62a and S62b) may be opened or closed by a control signal (Vpwm) generated by the controller 200.

As another example, the driver 120 may include a T-type neutral point clamped inverter 123.

When the driver 120 includes the T-type neutral point clamped inverter 123, the smoothing circuit may include a pair of capacitor (C71 and C72) connected in series, as illustrated in FIG. 4. In addition, the DC power (VDD) and a ground (GND) may be formed on both ends of the pair of capacitor (C71 and C72), and a neutral point (NP) having a voltage of VDD/2 may be formed on a node in which of the pair of capacitor (C71 and C72) are connected.

The T-type neutral point clamped inverter 123 may include an a-phase output terminal (OUTa), a b-phase output terminal (OUTb) and a c-phase output terminal (OUTc) and the three output terminals (OUTa, OUTb and OUTc) may be connected to an a, b, and a c-phase input terminal of the first and second motors 150 and 160, respectively.

Three upper switching circuits (S71, S81, and S91) may be provided between the three output terminals (OUTa, OUTb and OUTc) and the DC power (VDD), and three lower switching circuits (S72, S82, and S92) may be provided between the three output terminals (OUTa, OUTb and OUTc) and the ground (GND). In addition, three pairs of neutral switching circuits (S73 and S74, S83 and S84, and S93 and S94) may be provided between the three output terminals (OUTa, OUTb and OUTc) and the NP.

The three upper switching circuits (S71, S81, and S91), the three lower switching circuits (S72, S82, and S92), and the three pairs of neutral switching circuits (S73 and S74, S83 and S84, and S93 and S94) may be opened or closed by a control signal (Vpwm) generated by the controller 200.

The switching circuits forming the inverter 121, 122, and 123 may employ an insulated gage bipolar transistor (IGBT) or a power field effect transistor (power FET) used to break or pass high voltage and current.

The first and second motors 150 and 160 may receive the driving current from the driver 120 and generate the kinetic energy. Particularly, the first and second motors 150 and 160 may rotate a rotor using a magnetic interaction between the rotor including a permanent magnet and a stator including a coil.

For example, the first and second motors 150 and 160 may employ a 3-phase synchronous motor. A rotor of the 3-phase synchronous motor may include a permanent magnet, and a stator of the 3-phase synchronous motor may include a coil generating rotating magnetic field by receiving a 3-phase driving current having an a-phase, a b-phase and a c-phase.

In addition, the 3-phase synchronous motor may rotate a rotor by an interaction between a magnetic field generated by the rotor and the rotating magnetic field of the stator.

The first current detector 130 may detect a first driving current (Iabc1) supplied to the first motor 150.

In addition, the first current detector 130 may include at least two current sensors. For example, the first current detector 130 may include an a-phase current sensor detecting an a-phase current supplied to an a-phase input terminal of the first motor 150, and a b-phase current sensor detecting a b-phase current supplied to a b-phase input terminal of the first motor 150. When the first current detector 130 detects an a-phase current and a b-phase current, the controller 200 may calculate a c-phase current based on the a-phase current and the b-phase current.

The first current detector 130 may include the b-phase current sensor detecting the b-phase current and the c-phase current sensor detecting the c-phase current, or may include the c-phase current sensor detecting the c-phase current and the a-phase current sensor detecting the a-phase current.

The driving current supplied to the motor is a high current of a few amperes (A) to a few hundred amperes (A). To detect such a high current, at least two current sensors included in the first current detector 130 may include a current transformer (CT) which proportionally reduces an intensity of the driving current, and an ampere meter which detects an intensity of the proportionally reduced current. In other words, the current sensors may calculate the first driving current by proportionally reducing the intensity of the driving current using the current transformer (CT) and then measuring the intensity of the proportionally reduced current.

An example in which the first current detector 130 includes the current sensor having the current transformer (CT) and the current meter is illustrated, but the present disclosure is not limited thereto. The first current detector 130 may include a hall sensor or a current sensor including a shunt resistor.

The first position detectors 170 may detect a location θ1 of the rotor included in the first motor 150.

For example, the first position detector 170 may include a hall sensor detecting the magnetic fields generated by the rotors included in the first motor 150. The hall sensor may be arranged at a proper location of the rotor included in each of the first motor 150, detect a change in the magnetic field according to rotation of the rotor, and detect the location of the rotor based on the detected magnetic field.

In another example, the first position detector 170 may include an encoder detecting the rotation of the rotors included in the first motor 150. The encoders may output pulse-shaped signals according to the rotation of the rotors, and may detect rotational displacements or rotating speeds of the rotors based on a period of the pulses and the number of the pulses.

In another example, the first position detector 170 may include a resolver detecting the rotation of the rotors included in the first motor 150. The resolvers may output sine waves according to the rotation of the rotors, and may detect the rotational displacements or the rotating speeds of the rotors based on a period of the sine waves and the number of the sine waves.

The second position detector 180 may detect a location θ2 of the rotor included in the second motor 160.

The controller 200 may generate the control signals (Vpwm) controlling the driver 120 based on the locations θ1 and θ2 of the rotors included in the first and second motors 150 and 160, and the first driving currents (Iabc1) of the first motor 150.

Particularly, the controller 200 may calculate a rotating speed ω1 and ω2 of the first and second motors 150 and 160 based on the locations θ1 and θ2 of the rotors included in the first and second motors 150 and 160, calculate a current command (Idq*) supplied to the first motor 150 or the second motor 160 based on the rotating speed ω1 and ω2 of the first and second motors 150 and 160 and the first and second driving currents (Iabc1 and Iabc2), and calculate a voltage command (Vdq*) applied to the first and second motors 150 and 160 based on the current command (Idq*). The controller 200 may perform pulse width modulation (PWM) on the voltage command (Vdq*) and generate the control signals (Vpwm).

The control signals (Vpwm) output from the controller 200 may turn on or off the plurality of switching circuits included in the driver 120. In addition, the driver 120 may apply a driving voltage (Vabc) corresponding to the voltage command to the first and second motors 150 and 160 according to a rate of a turned-on time of the control signals (Vpwm), i.e., a duty rate. The first and second driving currents (Iabc1 and Iabc2) corresponding to the driving voltage (Vabc) may be supplied to the first and second motors 150 and 160.

When the load of the first motor 150 is the same as the load of the second motor 160, the controller 200 may control the first and second motors 150 and 160 based on the rotating speed and the driving current of one of the first and second motors 150 and 160. For example, the controller 200 may generate the current command and the voltage command based on the rotating speed ω1 and first driving current (Iabc1) of the first motor 150, and generate the control signals (Vpwm) according to the generated voltage command.

When the load of the first motor 150 and the load of the second motor 160 are different from each other, the controller 200 may generate a d-axis current command based on a difference between the rotating speed ω1 of the first motor 150 and the rotating speed ω2 of the second motor 160. The d-axis current command may allow the rotating speed ω1 of the first motor 150 and the rotating speed ω2 of the second motor 160 to be equal to each other.

The controller 200 may include one or two or more micro-processors configured to perform calculation according to a given program and data, and one or two or more memories configured to store the program and the data.

The detailed structure and operation of the controller 200 will be described below in details.

Although not illustrated in FIGS. 1 and 2, the power system 100 may include a gate driver configured to generate a gate drive signal turning on or off the plurality of switching circuits included in the driver 120 according to the control signals (Vpwm) output from the controller 200.

The micro-processor included in the controller 200 may typically be a logic circuit having a driving voltage of 3.3.V to 5V, but the driver 120 may include an inverter having a driving voltage of 300V or more.

For example, when the electric power supply 110 rectifies an AC power of 220V and generates a DC power, a DC power of about 310V may be supplied to the driver 120. That is, a high voltage of 310V may be applied to both ends of each of the plurality of switching circuits included in the driver 120. The power switching circuit (e.g., the IGBT, the power FET or the like) which breaks or passes the high voltage of 310V may typically use a signal having a voltage of 15V or more as the gate signal turning on or off a switch.

Due to a difference between the output voltage (3.3V to 5V) of the controller 200 and the input voltage (15V or more) of the driver 120, the gate driver may convert the control signals Vpwm (3.3V to 5V) output from the controller 200 into a gate drive signal corresponding to the input voltage (15V or more) of the driver 120. In other words, the gate driver may raise the voltage of the control signal (Vpwm) and generate the gate drive signal.

The structure of the power system 100 according to an embodiment has been described above.

Hereinafter the operation of the power system 100 according to an embodiment, particularly, the operation of the controller 200 will be described.

According to an embodiment, the controller 200 of the power system 100 may convert the a-phase, the b-phase and the c-phase of the first and second motors 150 and 160 into a d axis and a q axis of rotating vector coordinates, and control operations of the first and second motors 150 and 160.

Particularly, the controller 200 may convert the a-phase, b-phase and c-phase currents of the first and second motors 150 and 160 into the d axis and q axis currents, calculate the d axis and q axis voltages based on the d axis and q axis currents, and also convert the d axis and q axis voltages into the a-phase, b-phase and c-phase voltages of the first and second motors 150 and 160. The controller 200 may perform the PWM on the a-phase, b-phase and c-phase voltage and output the control signals (Vpwm).

The d axis represents an axis of a direction which coincides with directions of the magnetic fields generated by the rotors of the first and second motors 150 and 160, and the q axis represents an axis of a direction which is 90 degrees ahead in the directions of the magnetic fields generated by the rotors. 90 degrees is not a mechanical angle of the rotor, but an electrical angle in which an angle between adjacent N poles or an angle between adjacent S poles included in the rotor is converted into 360 degrees.

A relationship between the d axis voltage (Vd) and q axis voltage (Vq), and the d axis current (Id) and q axis current (Iq) may be expressed by the following Equation 1.

$$\begin{bmatrix} V_{dk} \\ V_{qk} \end{bmatrix} = \begin{bmatrix} R_S & -\omega_r L_S \\ \omega_r L_S & R_S \end{bmatrix} \begin{bmatrix} I_{dk} \\ I_{qk} \end{bmatrix} + \begin{bmatrix} 0 \\ \omega_r \lambda_f \end{bmatrix} \quad \text{Equation 1}$$

(wherein Vdk is the d axis voltage of a k-th motor, Vqk is the q axis voltage of the k-th motor, Rs is resistance of a coil included in the stator, Ls is inductance of the coil included in the stator, λf is a magnetic flux of a permanent magnet included in the rotor, ωr is the rotating speed of the rotor, Idk is the d axis current of the k-th motor, and Iqk is the q axis current of the k-th motor.)

At this time, when the resistances of the coils included in the rotors of the first and second motors 150 and 160 are ignored, a torque (Te) of each of the first and second motors 150 and 160 may be expressed by the following Equation 2.

$$T_e = \frac{3}{2}\frac{P}{2}\lambda_f I_{qk} \quad \text{Equation 2}$$

(wherein Te is the torque of the motor, P is the number of poles of the rotor, λf is the magnetic flux of the permanent magnet included in the rotor, and Iqk is the q axis current of the k-th motor.)

According to Equation 2, the torque (Te) of each of the first and second motors 150 and 160 may depend on the q axis current (Iqk). Therefore, when the loads of the first and second motors 150 and 160 are the same as each other, and the first and second motors 150 and 160 rotates at the same speed, the controller 200 may control the a-phase, b-phase and c-phase driving voltages so that the q axis current (Iqk) is supplied according to the loads of the first and second motors 150 and 160 and the d axis current (Idk) becomes "0".

Figure 5:
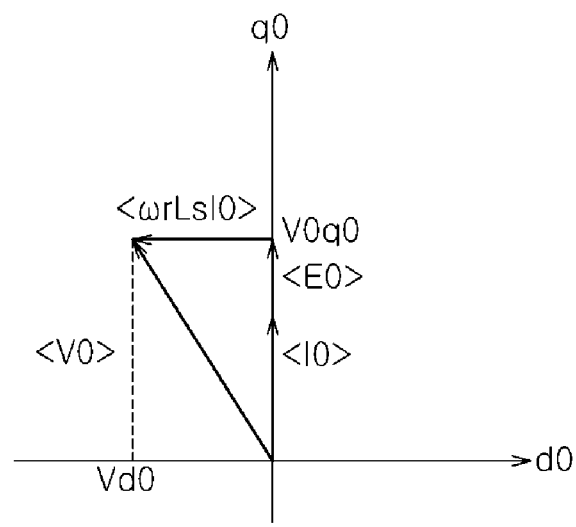
FIG. 5 is a view illustrating a dq axis current and a dq axis voltage when the load of the first motor and the load of the second motor in the power system according to an embodiment coincide with each other.

FIG. 5 is a view illustrating a dq axis current and a dq axis voltage when the load of the first motor and the load of the second motor in the power system coincide with each other according to an embodiment.

Referring to FIG. 5, when the load of the first motor 150 and the load of the second motor 160 coincide with each other, a d1 axis-q1 axis of the first motor 150 may coincide with a d2 axis-q2 axis of the second motor 160. (Hereinafter, when the d1 axis-q1 axis of the first motor 150 coincides with the d2 axis-q2 axis of the second motor 160, it will be referred to as a "d0 axis-q0 axis").

In addition, when the load of the first motor 150 and the load of the second motor 160 coincide with each other, the controller 200 may control the driver 120 so that a dq axis current (I0) in a direction which coincides with a q0 axis is supplied to the first and second motors 150 and 160, as illustrated in FIG. 5. That is, the controller 200 may control the driver 120 so that a d0 axis current of "0" and a q0 axis current of "I0q0" are supplied to the first and second motors 150 and 160, respectively.

A dq axis voltage to be applied to the first and second motors 150 and 160 so that the dq axis current (I0) is supplied will be described.

First, a counter electromotive force (E0) due to the rotation of the rotor may be generated in a direction which coincides with the q0 axis. In addition, the voltage and current of the inductance may have a 90 degree phase difference, and thus a voltage drop (ωr*Ls*I0) due to the coil of the motor may be generated in a direction vertical to the dq axis current (I0). That is, the voltage drop (ωr*Ls*I0) due to the coil may be generated in a direction of the d0 axis.

To supply the dq axis current (I0) to the first and second motors 150 and 160, a dq axis voltage (V0) corresponding to a vector sum of the voltage drop (ωr*Ls*I0) due to the coil of the stator and the counter electromotive force (E0) may be applied to the first and second motors 150 and 160. That is, as illustrated in FIG. 5, it may be required that a d0 axis voltage of "V0d0" and a q0 axis voltage of "V0q0" are applied to the first and second motors 150 and 160.

In summary, when the load of the first motor 150 and the load of the second motor 160 coincide with each other, the controller 200 may control the driver 120 so that the d0 axis voltage of "V0d0" and the q0 axis voltage of "V0q0" are applied to the first and second motors 150 and 160, as illustrated in FIG. 5. As a result, the d0 axis current of "0" and the q0 axis current of "I0q0" may be supplied to the first and second motors 150 and 160.

As described above, when the load of the first motor 150 and the load of the second motor 160 coincide with each other, the d1 axis-q1 axis of the first motor 150 may coincide with the d2 axis-q2 axis of the second motor 160, and thus the controller 200 may control the first and second motors 150 and 160 based on the driving current and the rotating speed of the first motor 150.

Particularly, the controller 200 may convert the a-phase, b-phase and c-phase currents supplied to the first motor 150 into the dq axis currents, and generate a dq axis current command to be supplied to the first motor 150, based on the dq axis currents and the rotating speed of the first motor 150.

The controller 200 may generate a dq axis voltage command to be applied to the first motor 150, based on the dq axis current command, and convert the dq axis voltage command into a-phase, b-phase and c-phase voltages, thereby outputting the a-phase, b-phase and c-phase voltages. At this time, the first motor 150 and the second motor 160 may be connected in parallel with each other, and thus the a-phase, b-phase and c-phase voltages applied to the first motor 150 may be also applied to the second motor 160. In addition, since the load of the first motor 150 and the load of the second motor 160 coincide with each other, the a-phase, b-phase and c-phase currents supplied to the first motor 150 may be equal to the a-phase, b-phase and c-phase currents supplied to the second motor 160.

However, when the load of the first motor 150 and the load of the second motor 160 are different from each other due to disturbance or the like, the rotating speed of the first motor 150 and the rotating speed of the second motor 160 may be different from each other, and the location θ1 of the rotor of the first motor 150 and the location θ2 of the rotor of the second motor 160 may be different from each other. As a result, the d1 axis-q1 axis of the first motor 150 and the d2 axis-q2 axis of the second motor 160 may be different from each other.

Figure 6:
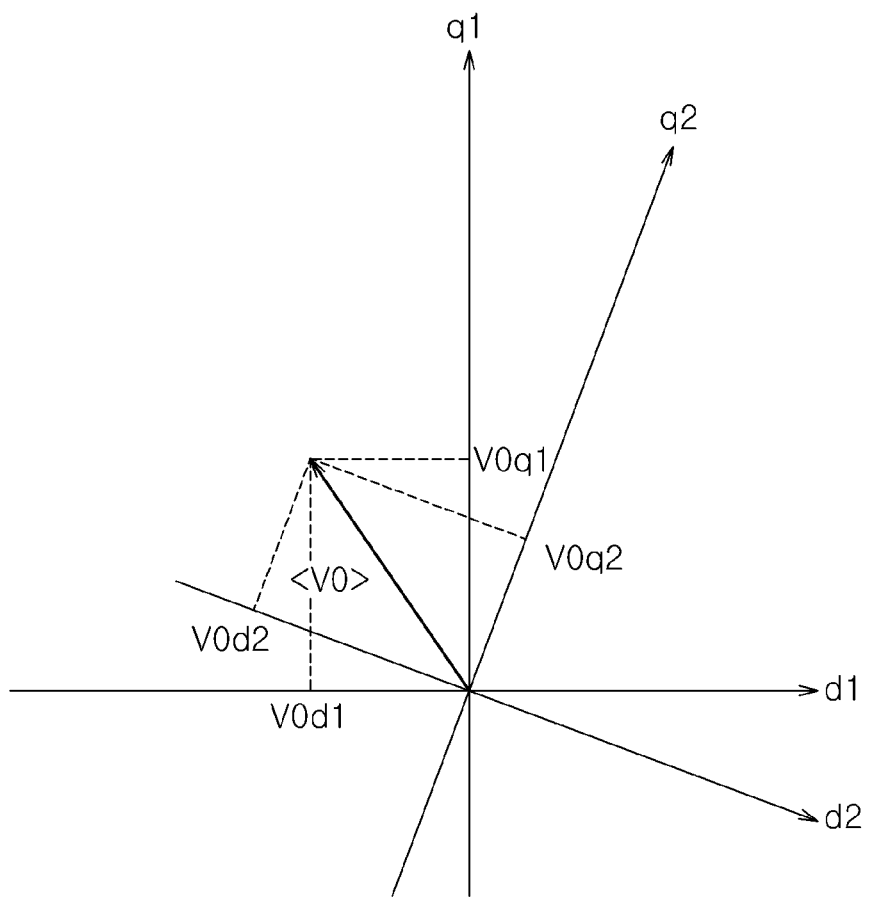
FIG. 6 is a view illustrating the dq axis voltage applied to the first and second motors when the load of the first motor and the load of the second motor included in the power system according to an embodiment are different from each other
Figure 7:
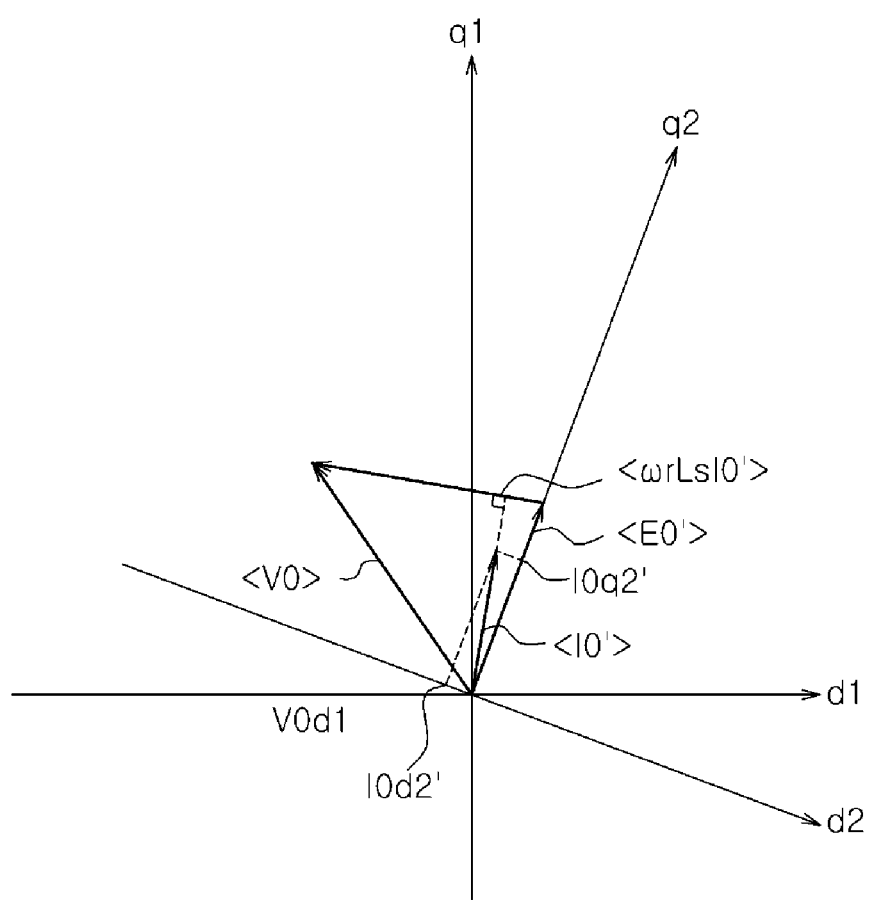
FIG. 7 is a view illustrating the dq axis current supplied to the second motor when the load of the first motor and the load of the second motor included in the power system according to an embodiment are different from each other.

FIG. 6 is a view illustrating the dq axis voltage applied to the first and second motors when the load of the first motor and the load of the second motor included in the power system according to an embodiment are different from each other, and FIG. 7 is a view illustrating the dq axis current supplied to the second motor when the load of the first motor and the load of the second motor included in the power system according to an embodiment are different from each other.

When the load of the first motor 150 and the load of the second motor 160 are different from each other, the d1 axis-q1 axis of the first motor 150 and the d2 axis-q2 axis of the second motor 160 may be dislocated from each other, as illustrated in FIG. 6.

When the dq axis voltage (V0) is applied to the first and second motors 150 and 160 since the d1 axis-q1 axis of the first motor 150 and the d2 axis-q2 axis of the second motor 160 are dislocated from each other, a d1 axis voltage of "V0d1" and a q1 axis voltage of "V0q1" may be applied to the first motor 150, and a d2 axis voltage of "V0d2" and a q2 axis voltage of "V0q2" may be applied to the second motor 160.

As mentioned above, since the d1-q1 axis voltage applied to the first motor 150 is different from the d2-q2 axis voltage applied to the second motor 160, the d1-q1 axis current applied to the first motor 150 may be different from the d2-q2 axis current applied to the second motor 160.

The counter electromotive force (E0) due to the rotation of the rotor included in the second motor 160 may be generated in a direction which coincides with the q2 axis of the second motor 160, as illustrated in FIG. 7. In addition, a vector difference of the dq axis voltage (V0) applied to the second motor 160 and the counter electromotive force (E0) of the second motor 160 may be the voltage drop (ωr*Ls*I0) due to the coil included in the second motor 160.

The dq axis current (I0) of the second motor 160 due to the dq axis voltage (V0) applied to the second motor 160 may be generated in a direction vertical to the voltage drop (ωr*Ls*I0) due to the coil. That is, a d2 axis current of "I0d2" and q2 axis current of "I0q2" may be supplied to the second motor 160, as illustrated in FIG. 7.

As described above, the dq axis current (I0) supplied to the second motor 160 may be different from the dq axis current (I0) supplied to the first motor 150. That is, the first driving current (Iabc1) supplied to the first motor 150 and the second driving current (Iabc2) supplied to the second motor 160 may be different from each other.

In other words, when the load of the first motor 150 and the load of the second motor 160 are different from each other, the controller 200 may not control the second motor 160 any longer, based on the driving current (Iabc1) of the first motor 150 and the rotating speed ω1 of the first motor 150.

As described above, when the load of the first motor 150 and the load of the second motor 160 are different from each other, the controller 200 may change a d1 axis current (Id1) of the first motor 150 to change an output torque of the second motor 160 without change in an output torque of the first motor 150.

According to Equation 2, since the output torque (Te) of the motor depends on the q axis current (Iqk) of the motor, the output torque of the first motor 150 may be not affected even when the d1 axis current (Id1) of the first motor 150 is changed.

As described above, the controller 200 may consistently fix the q1 axis current of the first motor 150 to consistently maintain the output torque of the first motor 150, and may change the d1 axis current of the first motor 150 to change the output torque of the second motor 160.

Since the d1 axis-q1 axis of the first motor 150 and the d2 axis-q2 axis of the second motor 160 are dislocated from each other, when the d1 axis current of the first motor 150 is changed, the q2 axis current as well as the d2 axis current of the second motor 160 may be changed, and the output torque of the second motor 160 may be also changed due to the change in the q2 axis current.

In summary, the output torque of the second motor 160 may be changed by changing the d1 axis current of the first motor 150.

Figure 8:
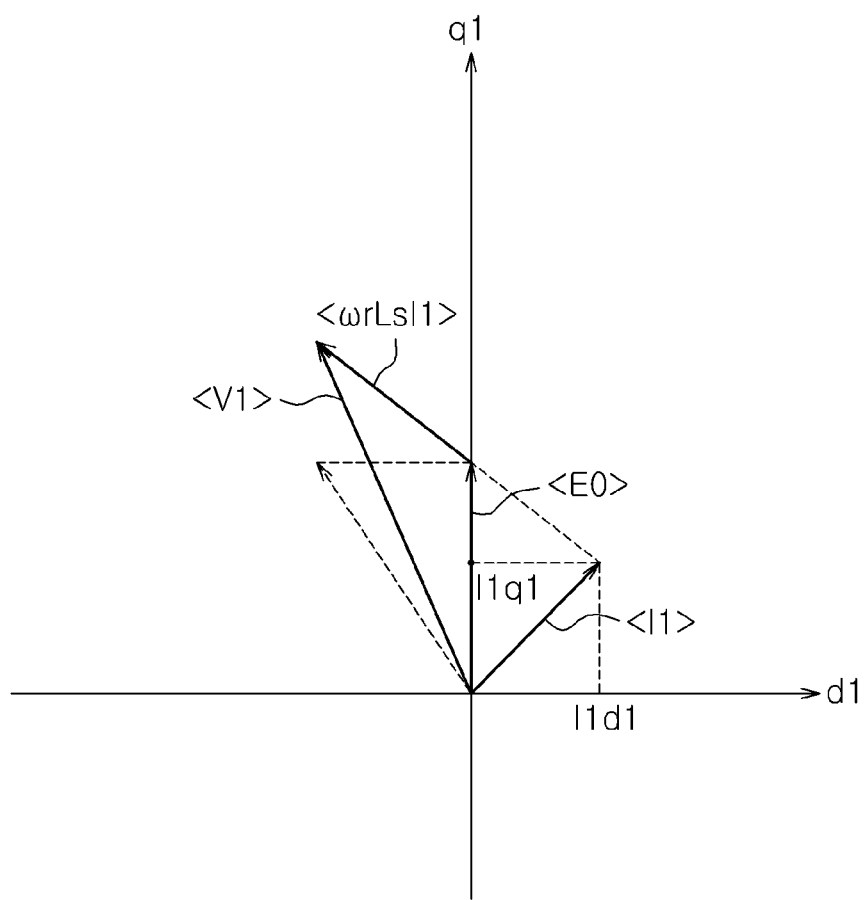
FIG. 8 is a view illustrating a change in the d axis current of the first motor included in the power system according to an embodiment.
Figure 9:
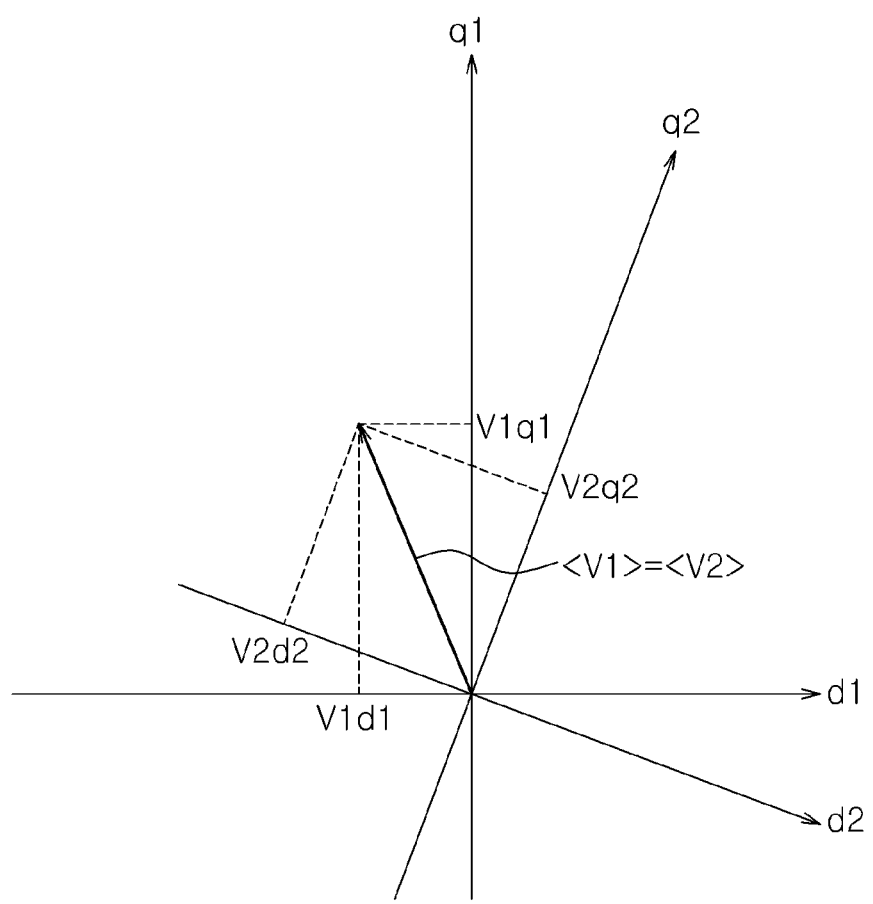
FIG. 9 is a view illustrating the dq axis voltage applied to the first and second motor when changing the d axis current of the first motor included in the power system according to an embodiment.
Figure 10:
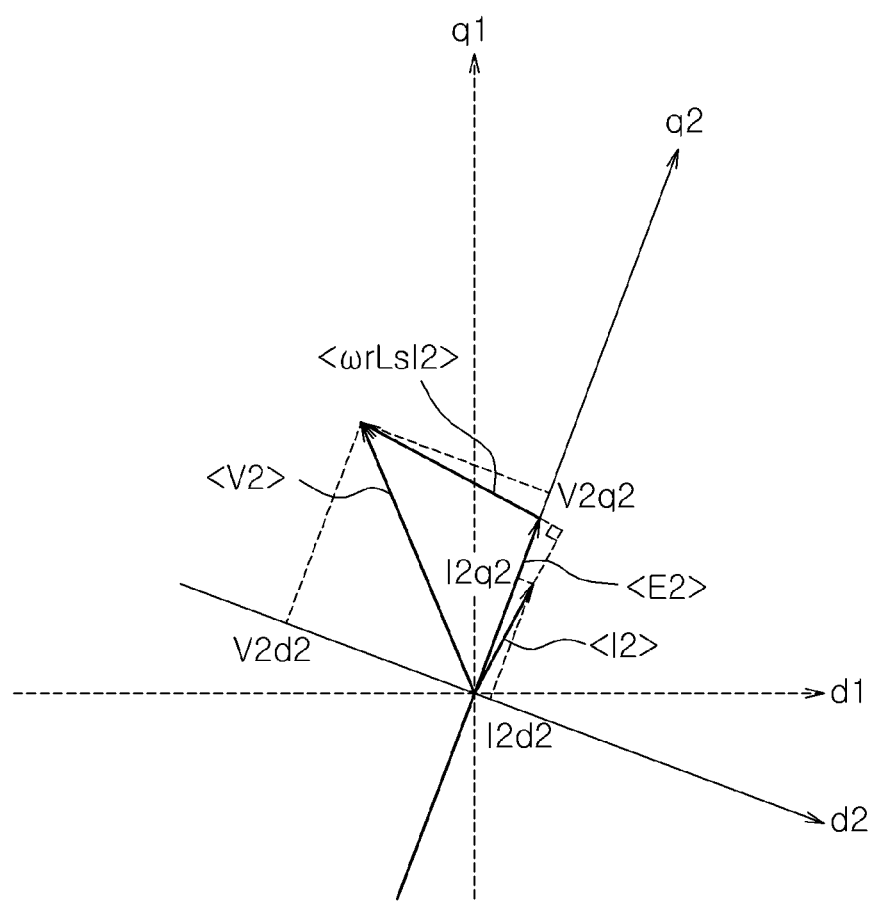
FIG. 10 is a view illustrating the dq axis current supplied to the second motor when changing the d axis current of the first motor included in the power system according to an embodiment.

FIG. 8 is a view illustrating a change in the d axis current of the first motor included in the power system according to an embodiment. In addition, FIG. 9 is a view illustrating the dq axis voltage applied to the first and second motor when changing the d axis current of the first motor included in the power system according to an embodiment, and FIG. 10 is a view illustrating the dq axis current supplied to the second motor when changing the d axis current of the first motor included in the power system according to an embodiment.

As illustrated in FIG. 8, the controller 200 may add a d1 axis current "I1d1" to the initial dq axis current (I0) so that the dq axis current (I1) is supplied to the first motor 150.

To this end, the controller 200 may control the driver 120 so that the dq axis voltage (V1) corresponding to the vector sum of the voltage drop (ωr*Ls*I0) due to the coil and the counter electromotive force (E0) is applied to the first and second motors 150 and 160. In other words, the controller 200 may control the driver 120 so that the d1 axis voltage of "V0d1(=V1d1)" and the q1 axis voltage of "V0q1+ωr*Ls*I1d1(=V1q1)" are applied to the first and second motors 150 and 160.

When the dq axis voltage (V1) is applied to the first motor 150, the dq axis voltage (V2) may be applied to the second motor 160 and V1 and V2 may be equal to each other since the first motor 150 and the second motor 160 are connected in parallel with each other.

However, the d1-q1 axis of the first motor 150 and the d2-q2 axis of the second motor 160 are dislocated from each other, a d2 axis voltage of "V2d2" and a q2 axis voltage of "V2q2" may be applied to the second motor 160, as illustrated in FIG. 9.

A counter electromotive force (E2) due to the rotation of the rotor included in the second motor 160 may be generated in a direction which coincides with the q2 axis of the second motor 160, as illustrated in FIG. 10. In addition, a vector difference of a dq axis voltage (V2) applied to the second motor 160 and the counter electromotive force (E2) of the second motor 160 may be a voltage drop (ωr*Ls*I2) due to the coil included in the second motor 160.

A dq axis current (I2) of the second motor 160 due to the dq axis voltage (V2) applied to the second motor 160 may be generated in a direction vertical to the voltage drop (ωr*Ls*I0) due to the coil. That is, a d2 axis current of "I2d2" and a q2 axis current of "I2q2" may be supplied to the second motor 160, as illustrated in FIG. 10.

When the dq axis current (I1) is supplied to the first motor 150, the dq axis current (I2) supplied to the second motor 160 may be different from the dq axis current (I0) of the second motor 160 in a state before the q axis current of the first motor 150 is changed (refer to FIG. 7). As a result, an output torque of the second motor 160 after the q axis current of the first motor 150 is changed may be different from an output torque of the second motor 160 before the d1 axis current of the first motor 150 is changed.

As mentioned above, when the load of the first motor 150 is different from the load of the second motor 160, the controller 200 may change the output torque of the second motor 160 by changing the d axis current of the first motor 150.

When the load of the first motor 150 is different from the load of the second motor 160, the controller 200 may change the d axis current of the first motor 150 so that the rotating speed ω2 of the second motor 160 is equal to the rotating speed ω1 of the first motor 150.

For example, the controller 200 may receive a feedback of the rotating speed ω2 of the second motor 160, and control the d axis current (Id1) of the first motor 150 so that a difference between the rotating speed ω1 of the first motor 150 and the rotating speed ω2 of the second motor 160 becomes "0" (zero) by using proportional controller (P), proportional integral controller (PI) or proportional integral derivative controller (PID)

Hereinafter a configuration of the controller 200 performing the above mentioned function will be described.

Figure 11:
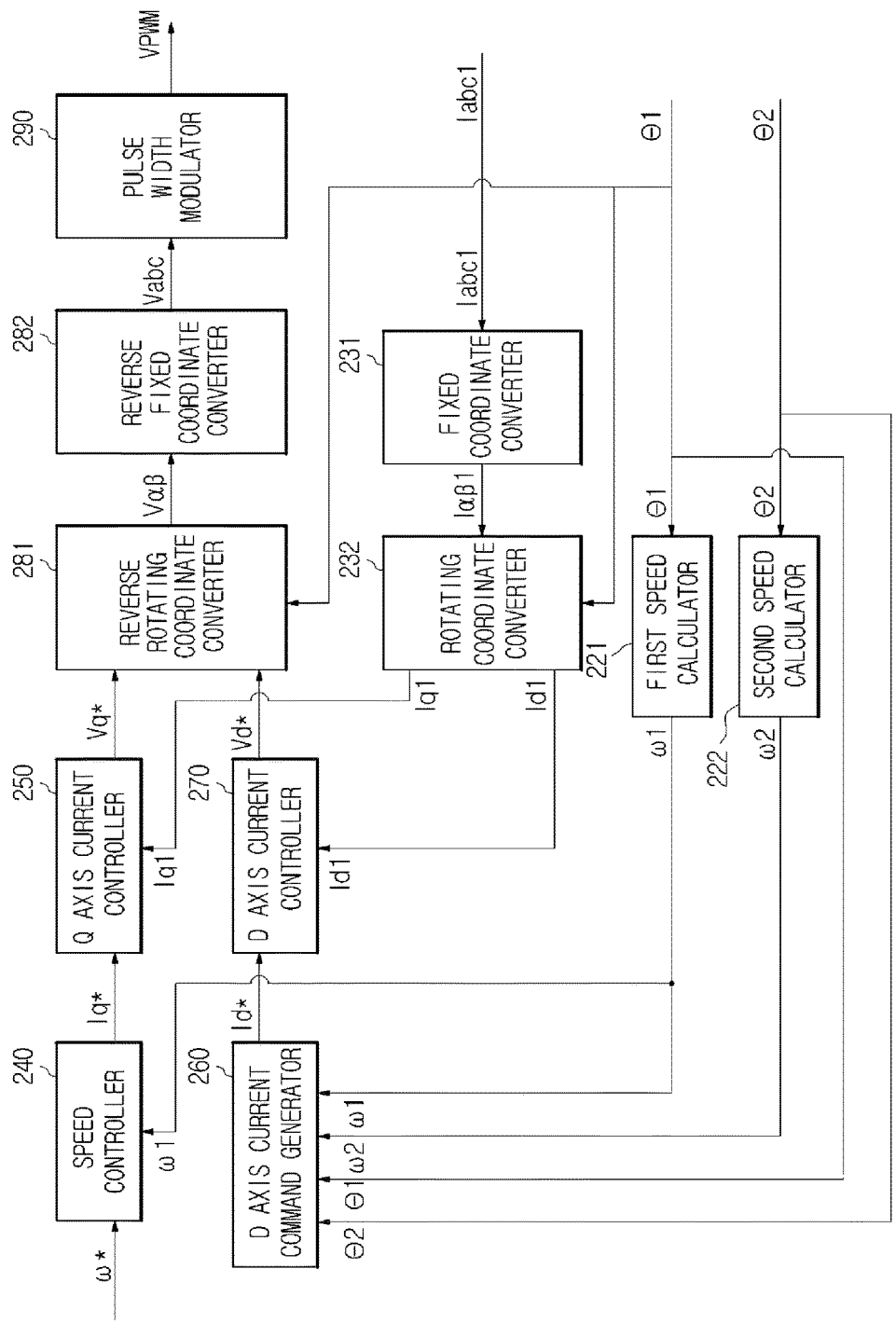
FIG. 11 is a view of an example of a controller included in the power system according to an embodiment.

FIG. 11 is a view of an example of a controller included in the power system according to an embodiment of the present disclosure.

Referring to FIG. 11, the controller 200 may include a first speed calculator 221; a second speed calculator 222; a fixed coordinate converter 231; a rotating coordinate converter 232; a speed controller 240; a q axis current controller 250; a d axis current command generator 260; a d axis current controller 270; a reverse rotating coordinate converter 281; a reverse fixed coordinate converter 282; and a pulse width modulator 290.

The first speed calculator 221 may calculate the rotating speed ω1 of the first motor 150 base on the location θ1 of the rotor of the first motor 150. For example, the first speed calculator 221 may calculate the rotating speed ω1 of the first motor 150 by differentiating the location θ1 of the rotor of the first motor 150.

The second speed calculator 222 may calculate the rotating speed ω2 of the second motor 160 base on the location θ2 of the rotor of the second motor 160.

The fixed coordinate converter 231 may convert an a-phase, a b-phase, and a c-phase current into the α axis and β axis current in a fixed vector coordinate system by using Equation 3.

$$\begin{bmatrix} I_\alpha \\ I_\beta \end{bmatrix} = \begin{bmatrix} 1 & 0 & 0 \\ 0 & 1/\sqrt{3} & -1/\sqrt{3} \end{bmatrix} \begin{bmatrix} I_a \\ I_b \\ I_c \end{bmatrix} \quad \text{Equation 3}$$

(wherein Iα is an α axis current in the fixed vector coordinate system, Iβ is a β axis current in the fixed vector coordinate system, Ia is an a-phase current, Ib is a b-phase current, and Ic is a c-phase current)

The rotating coordinate converter 232 may convert the α axis and β axis current in the fixed vector coordinate system into the d axis and q axis current in the rotating vector coordinate system by using Equation 4.

$$\begin{bmatrix} I_d \\ I_q \end{bmatrix} = \begin{bmatrix} \cos\theta 1 & \sin\theta 1 \\ -\sin\theta 1 & \cos\theta 1 \end{bmatrix} \begin{bmatrix} I_\alpha \\ I_\beta \end{bmatrix} \quad \text{Equation 4}$$

(wherein Id is a d axis current in the rotating coordinate system, Iq is a q axis current in the rotating coordinate system, θ1 is a location of the rotor of the first motor, Ia is an a axis current in the fixed vector coordinate system, and Iβ is a β axis current in the fixed vector coordinate system)

Accordingly, the fixed coordinate converter 231 and the rotating coordinate converter 232 may convert the a-phase, the b-phase, and the c-phase current into the d axis and q axis current in the rotating vector coordinate system based on the location θ1 of the rotor of the first motor 150.

The speed controller 240 may compare a speed command ω* input from an outside with the rotating speed ω1 of the first motor 150, and output a q axis current command (Iq*) depending on a result of the comparison. The speed controller 240 may include a proportional controller (P), a proportional integral controller (PI) or a proportional integral derivative controller (PID).

The q axis current controller 250 may compare a q axis current command (Iq*) output from the speed controller 240 with the q axis current (Iq1) of the first motor 150, and output a q axis voltage command (Vq*) depending on a result of the comparison. The q axis current controller 250 may also include the proportional controller, the proportional integral controller or the proportional integral derivative controller.

The d axis current command generator 260 may output a d axis current command (Id*) based on the rotating speed ω1 of the first motor 150, the rotating speed ω2 of the second motor 160, the location θ1 of the first rotor and the location θ2 of the second rotor.

Particularly, the d axis current command generator 260 may generate a d axis current command (Id1*) based on a difference between the rotating speed ω1 of the first motor 150 and the rotating speed ω2 of the second motor 160, and a difference between the location θ1 of the first rotor and the location θ2 of the second rotor.

The d axis current command generator 260 may generate the d axis current command (Id1*) based on the difference between the rotating speed ω1 of the first motor 150 and the rotating speed ω2 of the second motor 160, but is not limited thereto. For example, since the rotating speed ω1 of the first motor 150 follows the speed command ω*, the d axis current command generator 260 may generate the d axis current command (Id1*) based on a difference between the speed command ω* and the rotating speed ω2 of the second motor 160.

The d axis current controller 270 may compare a d axis current command (1d*) output from the d axis current command generator 260 with the d axis current (Id1) of the first motor 150, and output a d axis voltage command (Vd*) depending on a result of the comparison. The d axis current controller 270 may also include the proportional controller, the proportional integral controller or the proportional integral derivative controller.

The reverse rotating coordinate converter 281 may convert the d axis and q axis voltage in the rotating vector coordinate system into the α axis and β axis voltage in the fixed vector coordinate system by using Equation 5.

$$\begin{bmatrix} V_\alpha \\ V_\beta \end{bmatrix} = \begin{bmatrix} \cos\theta1 & -\sin\theta1 \\ \sin\theta1 & \cos\theta1 \end{bmatrix} \begin{bmatrix} V_d \\ V_q \end{bmatrix} \quad \text{Equation 5}$$

(wherein Vα is a α axis voltage in the fixed vector coordinate system, Vβ is a β axis voltage in the fixed vector coordinate system, θ1 is a location of the rotor of the first motor, Vd is a d axis voltage in rotating coordinate system, and Vq is a q axis voltage in the rotating coordinate system.)

The reverse fixed coordinate converter 282 may convert the α axis and β axis voltage in the fixed vector coordinate system into an a-phase, a b-phase, and a c-phase voltage by using Equation 6.

$$\begin{bmatrix} V_a \\ V_b \\ V_c \end{bmatrix} = \begin{bmatrix} 1 & 0 \\ -1/2 & \sqrt{3}/2 \\ -1/2 & -\sqrt{3}/2 \end{bmatrix} \begin{bmatrix} V_\alpha \\ V_\beta \end{bmatrix} \quad \text{Equation 6}$$

(wherein Va is an a-phase voltage, Vb is a b-phase voltage, Vc is a c-phase voltage, Vα is an α axis voltage in the fixed vector coordinate system, and Vβ is a β axis voltage in the fixed vector coordinate system.)

Accordingly, the reverse rotating coordinate converter 281 and the reverse fixed coordinate converter 282 may convert the d axis and q axis voltage into the a, b, and c-phase voltage in the rotating vector coordinate system based on the location θ1 of the rotor of the first motor 150.

The pulse width modulator 290 may generate the control signals (Vpwm) to be supplied to the driver 120, based on the a, b and c-phase voltage (Vabc). Particularly, the pulse width modulator 290 may perform pulse width modulation (PWM) on each a, b and c-phase voltage (Vabc), and generate the control signals (Vpwm) which turn on or off the plurality of switching circuits included in the driver 120.

Figure 12:
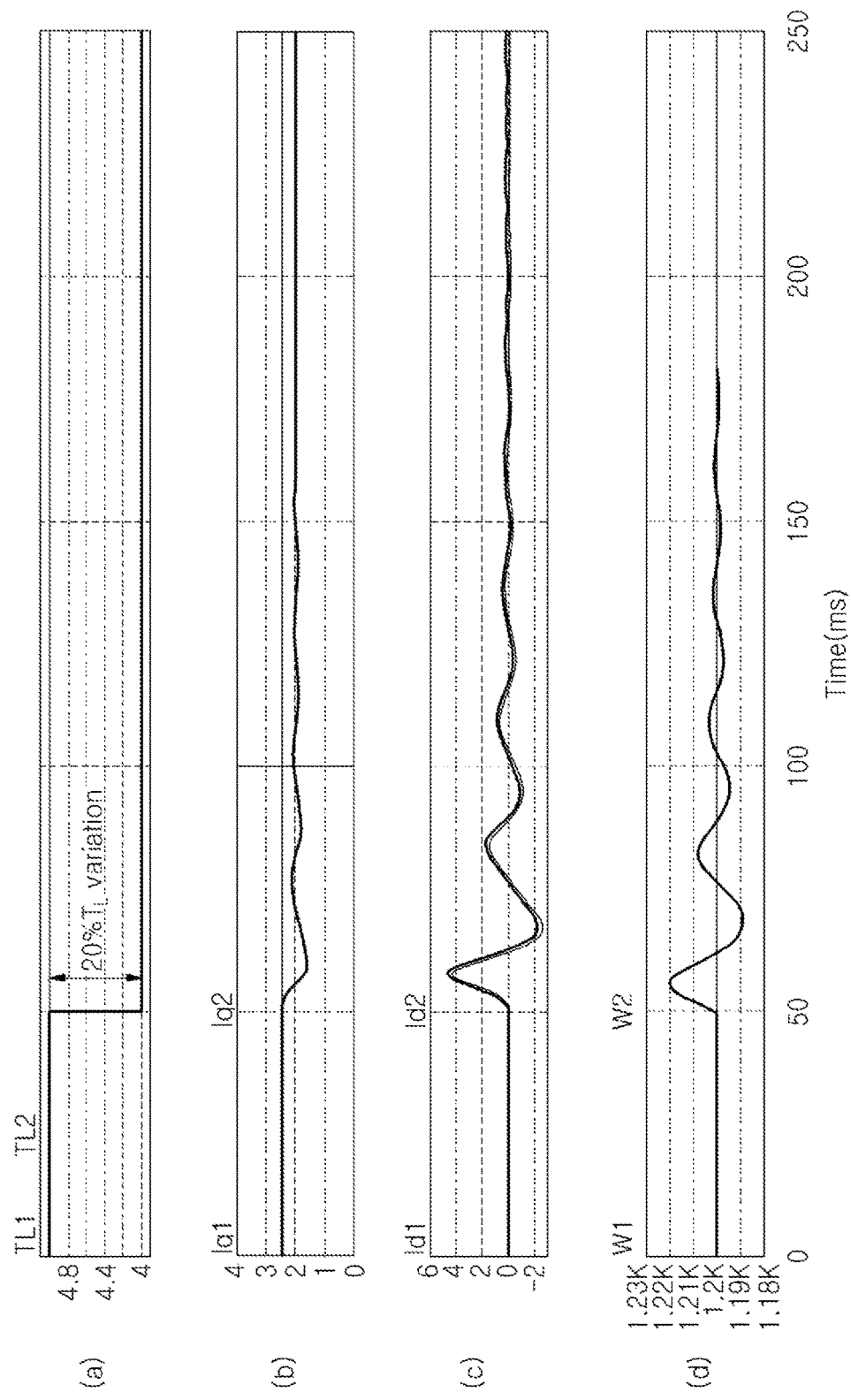
FIG. 12 is a view illustrating the d axis and q axis currents and the rotating speeds of the first and second motors included in the power system according to an embodiment.

FIG. 12 is a view illustrating the d axis and q axis currents and the rotating speeds of the first and second motors included in the power system according to an embodiment of the present disclosure.

Referring to FIG. 12A, the same load may be initially applied to the first motor 150 and the second motor 160, and after approximately 50 ms, the load applied to the second motor 160 may be reduced by approximately 20%.

As a result, as illustrated in FIG. 12D, the rotating speed ω1 of the first motor 150 may be equal to the rotating speed ω2 of the second motor 160 during from 0 (zero) ms to approximately 50 ms. However, the rotating speed ω2 of the second motor 160 may be changed after approximately 50 ms in which the load of the second motor 160 is reduced by approximately 20%. Particularly, as illustrated in FIG. 12D, the rotating speed ω2 of the second motor 160 may be increased due to the reduction of the load of the second motor 160.

When a difference between the rotating speed ω1 of the first motor 150 and the rotating speed ω2 of the second motor 160 is detected, the controller 200 may change the d axis current (Id1) of the first motor 150 while consistently maintaining the q axis current (Iq1) of the first motor 150, as illustrated in FIGS. 12B and 12C.

The q axis current (Iq2) of the second motor 160 as well as the d axis current (Id2) of the second motor 160 may be changed due to the change in the q axis current (Iq1) of the first motor 150, as illustrated in FIGS. 12B and 12C. Particularly, the q axis current (Iq2) of the second motor 160 may be reduced, as illustrated in FIG. 12B.

In addition, due to the reduction of the q axis current (Iq2) of the second motor 160, an increase range of the rotating speed of the second motor 160 may be reduced and finally, the rotating speed of the second motor 160 may be reduced.

As the above mentioned process, the rotating speed ω1 of the first motor 150 and the rotating speed ω2 of the second motor 160 may be almost equal to each other when approximately 100 ms, e.g. 150 ms is passed after the reduction of the load of the second motor 160 is started. In addition, the variation of the q axis current (Iq1) of the first motor 150, and the d axis and q axis (Id2 and Iq2) of the second motor 160 may be almost disappeared.

However, the q axis current (Iq2) of the second motor 160 may be smaller than the q axis current (Iq1) of the first motor 150 due to the reduction of the load of the second motor 160.

Hereinbefore the power system according to an embodiment has been described above.

Hereinafter a power system according to another embodiment will be described. Like reference numerals to those used in describing the power system according to an embodiment denote like features in the power system according to another embodiment, and a description thereof will be omitted FIG. 13 is a view illustrating a power system according to another embodiment, and FIG. 14 is a view illustrating an example of a controller included in the power system of FIG. 13.

Figure 13:
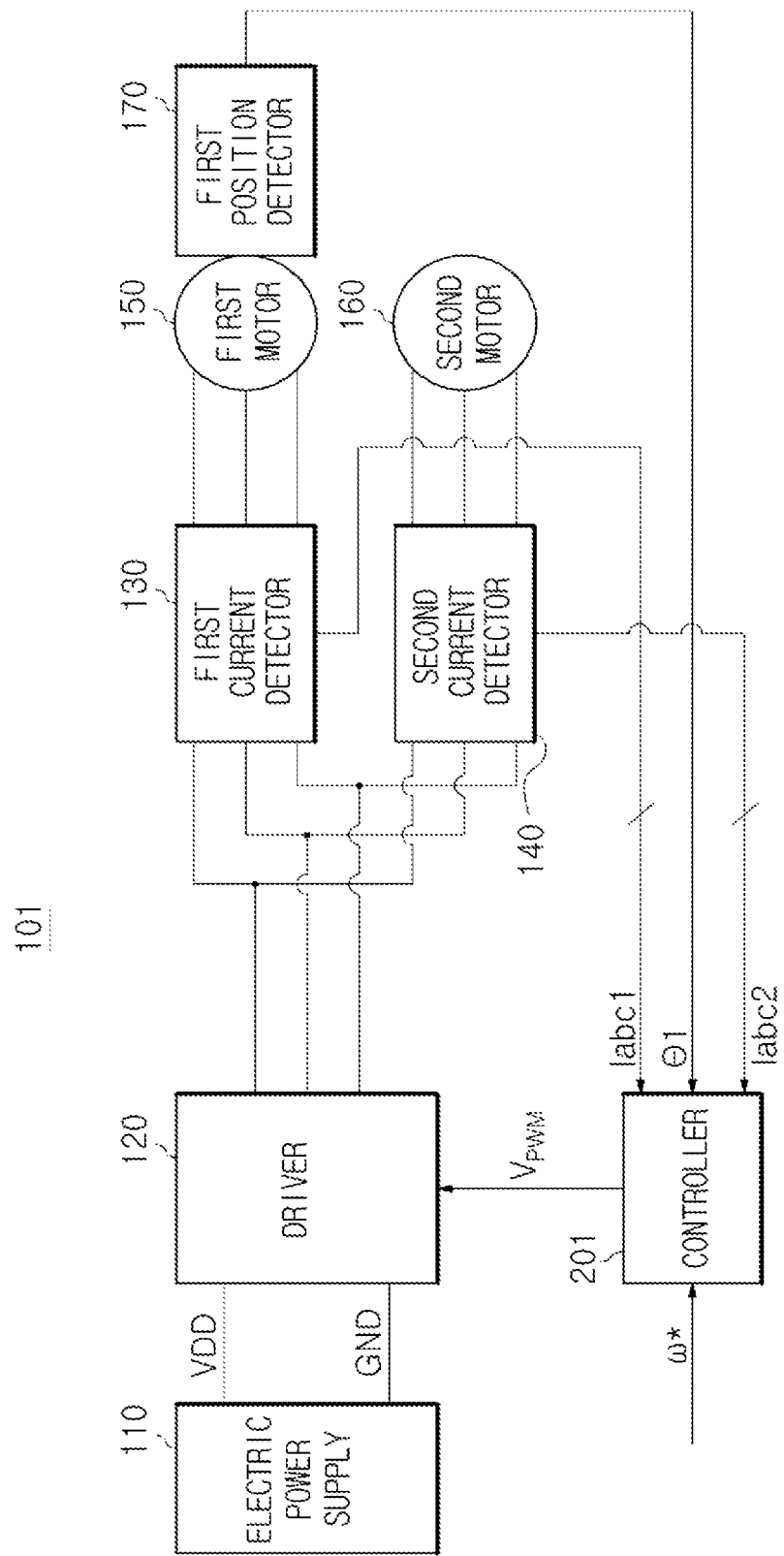
FIG. 13 is a view illustrating a power system according to another embodiment.
Figure 14:
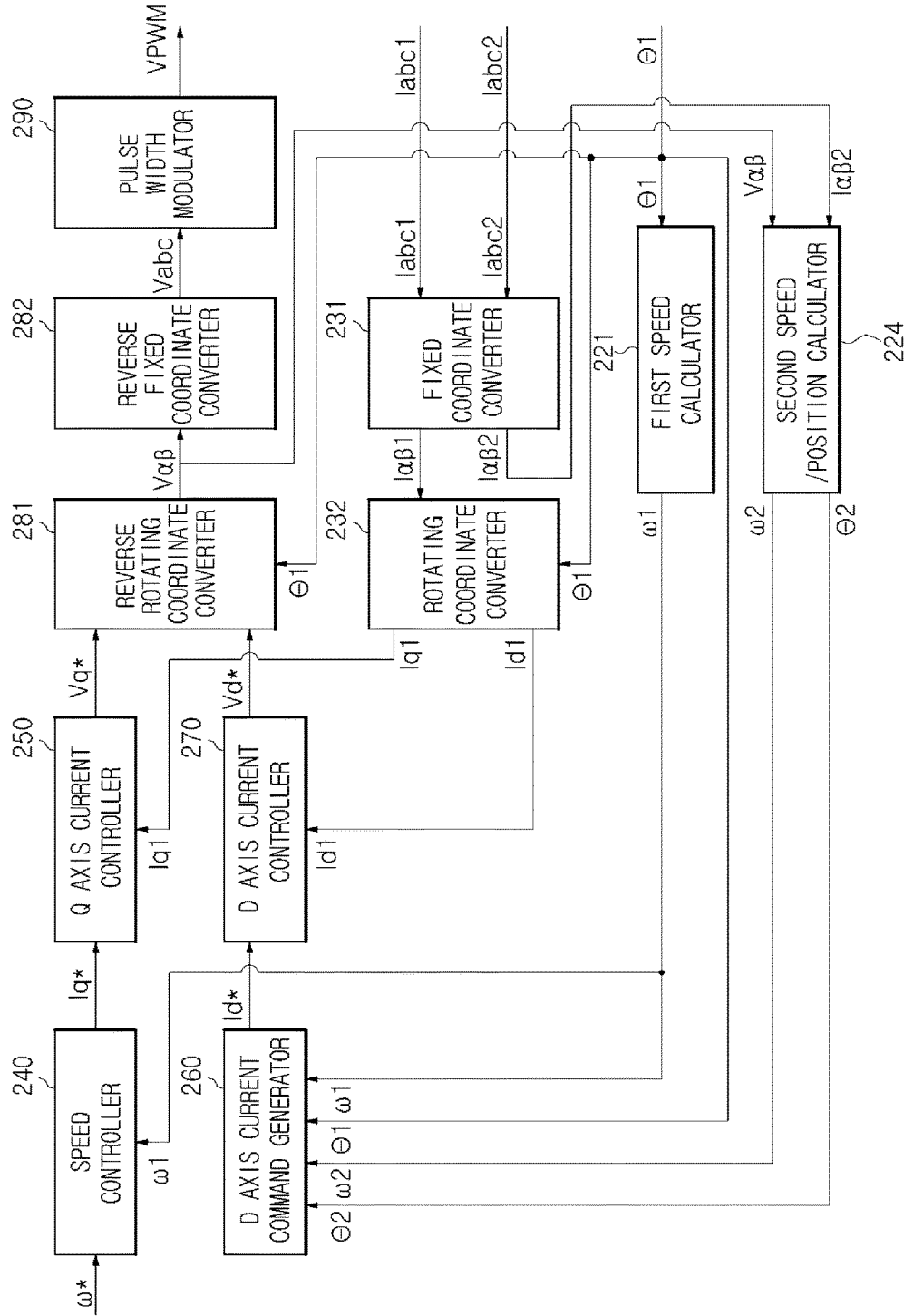
FIG. 14 is a view illustrating an example of a controller included in the power system of FIG. 13.

Referring to FIGS. 13 and 14, a power system 101 may include an electric power supply 110, a driver 120, a first motor 150, a second motor 160, a first current detector 130, a second current detector 140, a first position detector 170, and a controller 201.

The controller 201 may include a first speed calculator 221; a second speed/position calculator 224; a fixed coordinate converter 231; a rotating coordinate converter 232; a speed controller 240; a q axis current controller 250; a d axis current command generator 260; a d axis current controller 270; a reverse rotating coordinate converter 281; a reverse fixed coordinate converter 282; and a pulse width modulator 290.

A description of the electric power supply 110, the driver 120, the first motor 150, the first current detector 130, the second current detector 140, the first speed calculator 221, the fixed coordinate converter 231, the rotating coordinate converter 232, the speed controller 240, the q axis current controller 250, the d axis current command generator 260, the d axis current controller 270, the reverse rotating coordinate converter 281, the reverse fixed coordinate converter 282, and the pulse width modulator 290 will be omitted.

The second current detector 140 may detect a second driving current (Iabc 2) supplied to the second motor 160.

In addition, the second current detector 140 may include at least two current sensors. For example, the second current detector 140 may include an a-phase current sensor detecting an a-phase current supplied to an a-phase input terminal of the second motor 160, and a b-phase current sensor detecting a b-phase current supplied to a b-phase input terminal of the second motor 160. When the second current detector 140 detects an a-phase current and a b-phase current, the controller 201 may calculate a c-phase current based on the a-phase current and the b-phase current.

The second current detector 140 may include the b-phase current sensor detecting the b-phase current and the c-phase current sensor detecting the c-phase current, or may include the c-phase current sensor detecting the c-phase current and the a-phase current sensor detecting the a-phase current.

To detect such a high current, at least two current sensors included in the second current detector 140 may include a current transformer (CT) which proportionally reduces an intensity of the driving current, and an ampere meter which detects an intensity of the proportionally reduced current. In other words, the current sensors may calculate the second driving current by proportionally reducing the intensity of the driving current using the current transformer (CT) and then measuring the intensity of the proportionally reduced current.

The fixed coordinate converter 231 may convert a first a, b and c-phase current (Iabc1) into a first α axis and β axis current (Iαβ1) in the fixed vector coordinate system as well as converting a second a, b and c-phase current (Iabc2) into a second α axis and β axis current (Iαβ2) in the fixed vector coordinate system.

The second speed/position calculator 224 may calculate the rotating speed ω2 of the second motor 160 and the location θ2 of the rotor of the second motor 160 based on the second α axis and β axis current (Iαβ2) in the fixed vector coordinate system and the α axis and β axis voltage (Vαβ) in the fixed vector coordinate system.

Particularly, the second speed/position calculator 224 may estimate a counter electromotive force of the second motor 160 using a motor model using the second α axis and β axis current (Iαβ2) in the fixed vector coordinate system and the α axis and β axis voltage (Vαβ) in the fixed vector coordinate system. Since a driving voltage applied to the motor is equal to a sum of a voltage drop due to the coil of the stator and the counter electromotive force, the second speed/position calculator 224 may estimate the counter electromotive force using the α axis and β axis voltage and the α axis and β axis current.

The second speed/position calculator 224 may calculate the rotating speed ω2 of the second motor 160 based on the estimated counter electromotive force, and estimate a location θ2 of the rotor of the second motor 160 by integrating the rotating speed ω2 of the second motor 160 by a time.

Although not shown in FIG. 14, in order to more accurately estimate the rotating speed ω2 of the second motor 160, the second speed/position calculator 224 may receive a feedback of the estimated rotating speed ω2 of the second motor 160.

When comparing FIGS. 1 to 11 with FIGS. 13 and 14, the second position detector 180 and the second speed calculator 222 may be omitted and the second current detector 140 and the second speed/position calculator 224 may be additionally provided in the power system 101 as illustrated in FIG. 13 in comparison with the power system 100 as illustrated in FIG. 1.

The power system 100 as illustrated in FIG. 1 may detect the first driving current (Iabc1) of the first motor 150 using the first current detector 130, detect the location θ1 of the rotor of the first motor 150 using the first position detector 170, and detect the location θ2 of the rotor of in the second motor 160 using the second position detector 180.

In contrast, the power system 101 as illustrated in FIG. 13 may detect the first driving current (Iabc1) of the first motor 150 using the first current detector 130, detect the location θ1 of the rotor of the first motor 150 using the first position detector 170, and detect the location θ2 of the rotor of the second motor 160 using the second current detector 140 and the second speed/position calculator 224.

Accordingly, the power system 100 as illustrated in FIG. 1 may detect the location θ1 and θ2 of the rotor included in the first and second motors 150 and 160 using the sensor, e.g. a hall sensor, and the power system 101 as illustrated in FIG. 13 may detect the location θ1 of the rotor of the first motor 150 using the sensor and detect the location θ2 of the rotor of the second motor 160 using the second driving current (Iabc2) of the second motor 160 without the sensor.

Figure 15:
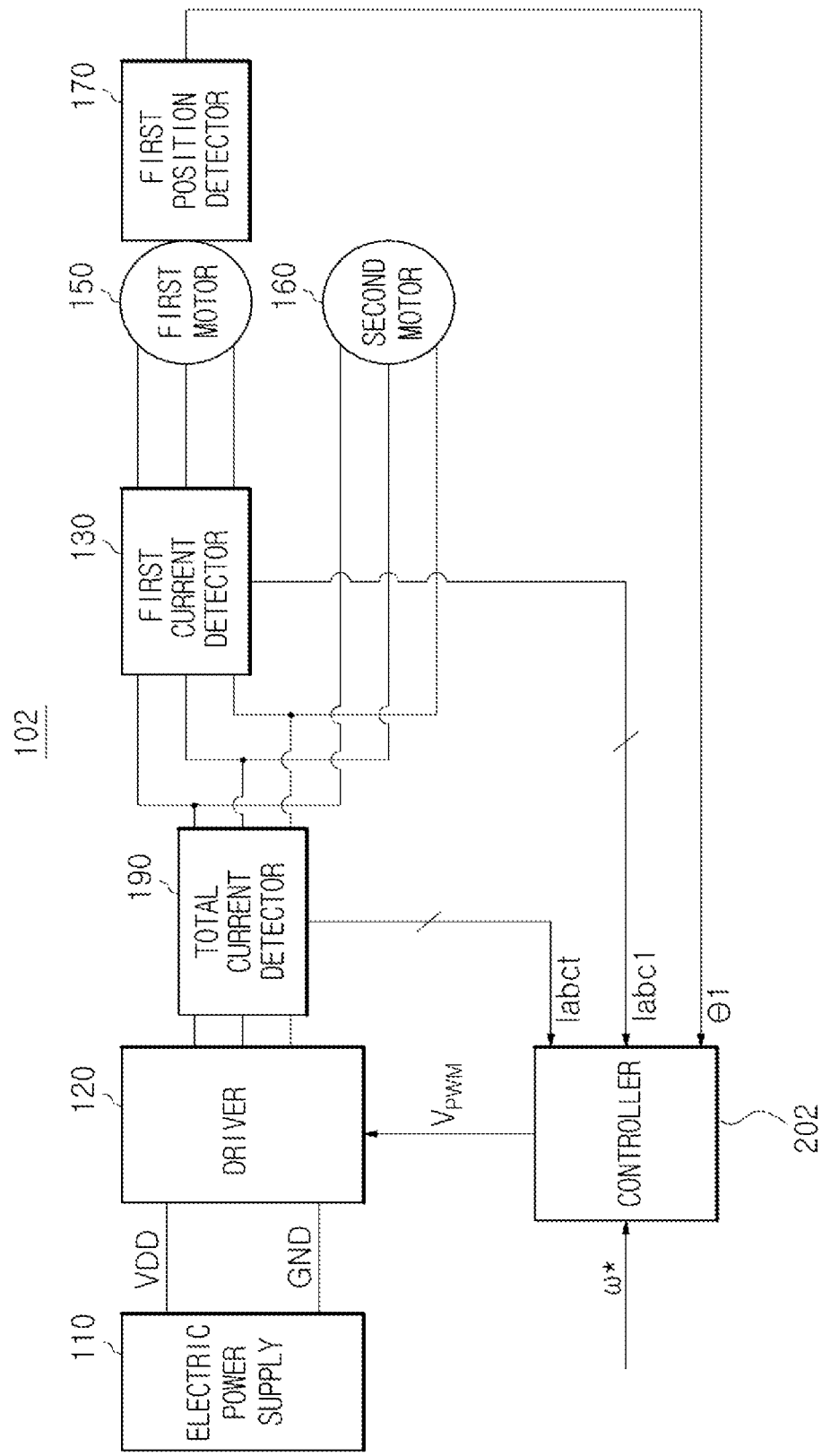
FIG. 15 is a view illustrating a power system according to another embodiment.
Figure 16:
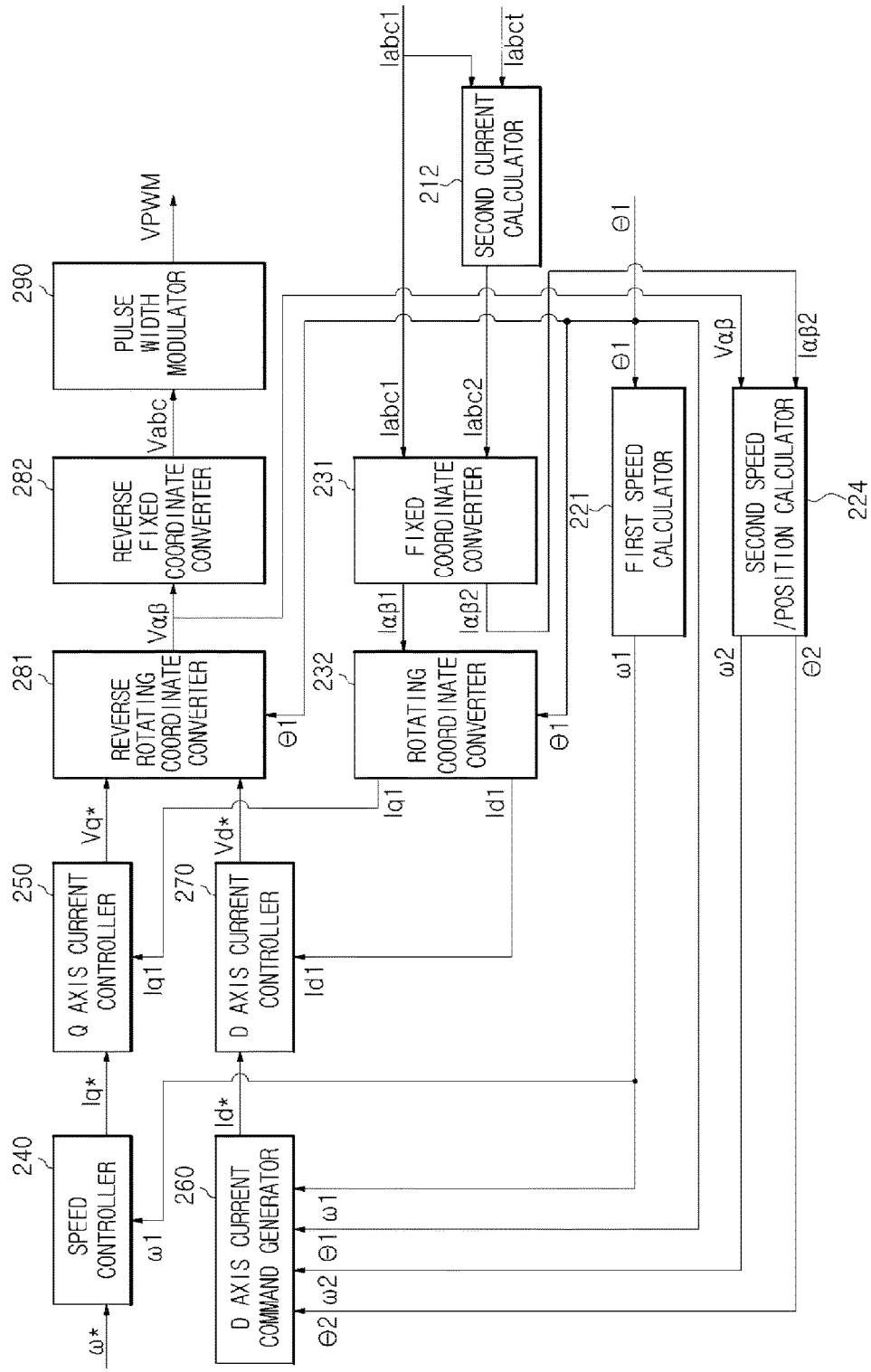
FIG. 16 is a view illustrating an example of a controller included in the power system of FIG. 15.

FIG. 15 is a view illustrating a power system according to another embodiment, and FIG. 16 is a view illustrating an example of a controller included in the power system of FIG. 15.

Referring to FIGS. 15 and 16, a power system 102 may include an electric power supply 110, a driver 120, a first motor 150, a second motor 160, a first current detector 130, a total current detector 190, and a controller 202.

The controller 202 may include a second current calculator 212; a first speed calculator 221; a second speed/position calculator 224; a fixed coordinate converter 231; a rotating coordinate converter 232; a speed controller 240; a q axis current controller 250; a d axis current command generator 260; a d axis current controller 270; a reverse rotating coordinate converter 281; a reverse fixed coordinate converter 282; and a pulse width modulator 290.

A description of the above described configuration will be omitted.

The total current detector 190 may detect a total driving current (Iabct) by summing a first driving current (Iabc1) of the first motor 150 and a second driving current (Iabc2) of the second motor 160. Particularly, the total current detector 190 may include at least two current sensors which detect a total driving current of at least two phases among a total a-phase driving current by summing a first a-phase driving current and a second a-phase driving current, a total b-phase driving current by summing a first b-phase driving current and a second b-phase driving current, and a total c-phase driving current by summing a first c-phase driving current and a second c-phase driving current.

In addition, the current detector may include a current transformer (CT) which proportionally reduces an intensity of the driving current, and an ampere meter which detects an intensity of the proportionally reduced current.

The total current of at least two phases detected by the total current detector 190 may be equal to the first driving current of two phases detected by the first current detector 130.

The second current calculator 212 may estimate the second driving current (Iabc2) based on the total driving current (Iabct) and the first driving current (Iabc1). Particularly, the second current calculator 212 may estimate the second driving current (Iabc2) by estimating a difference between the total driving current (Iabct) and the first driving current (Iabc1) at the same phase.

For example, when the total current detector 190 and the first current detector 130 detect a driving current of a and c-phase, respectively, the second current calculator 212 may estimate a second a-phase driving current corresponding to a difference between the total a-phase driving current and the first a-phase driving current. In addition, the second current calculator 212 may estimate a second c-phase driving current corresponding to a difference between the total c-phase driving current and the first c-phase driving current When comparing FIGS. 1 to 11 with FIGS. 15 and 16, the second position detector 180 and the second speed calculator 222 may be omitted and the total current detector 190, the second current calculator 212 and the second speed/position calculator 224 may be additionally provided in the power system 102 as illustrated in FIG. 15 in comparison with the power system 100 as illustrated in FIG. 1.

The power system 100 as illustrated in FIG. 1 may detect the location θ2 of the rotor of the second motor 160 using the second position detector 180, but the power system 102 as illustrated in FIG. 15 may detect the location θ2 of the rotor of the second motor 160 using the total current detector 190, the second current calculator 212 and the second speed/position calculator 224.

Accordingly, the power system 100 as illustrated in FIG. 1 may detect the location θ1 and θ2 of the rotor included in the first and second motors 150 and 160 using the sensor, e.g. a hall sensor, and the power system 102 as illustrated in FIG. 15 may detect the location θ1 of the rotor of the first motor 150 using the sensor and detect the location θ2 of the rotor of the second motor 160 using the second driving current (Iabc2) of the second motor 160 without the sensor.

In addition, since the power system 102 as illustrated in FIG. 15 detects the total driving current supplied by the driver 120 using the total current detector 190, the power system 102 may determine whether an overcurrent flows in the driver 120 or not by comparing the total driving current detected by the total current detector 190 with a reference current. When it is determined that an overcurrent flows in the driver 120, the power system 102 may control a driving current flowing in the driver 120 by using a protection circuit that is additionally provided.

Figure 17:
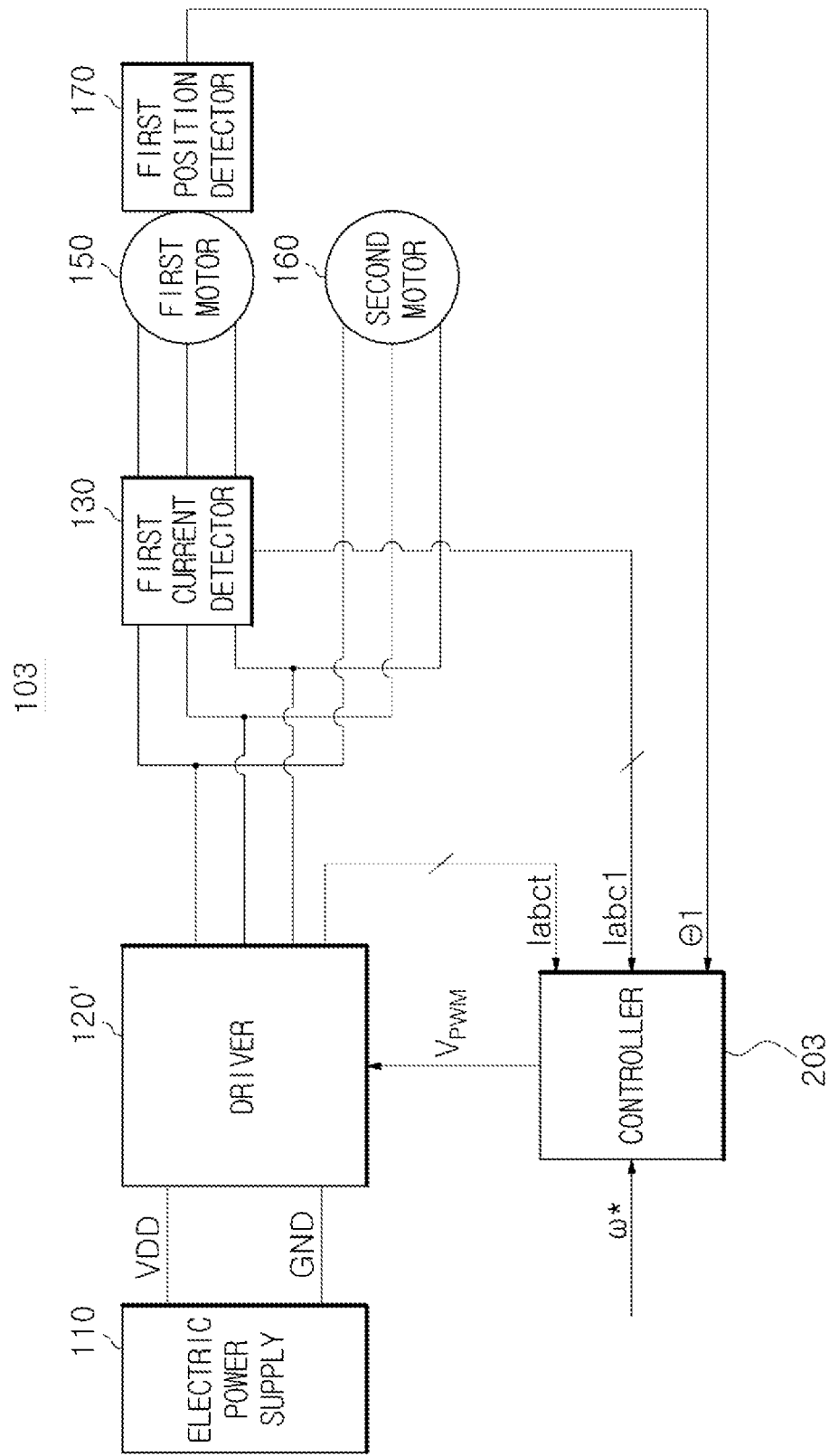
FIG. 17 is a view illustrating a power system according to another embodiment.
Figure 18:
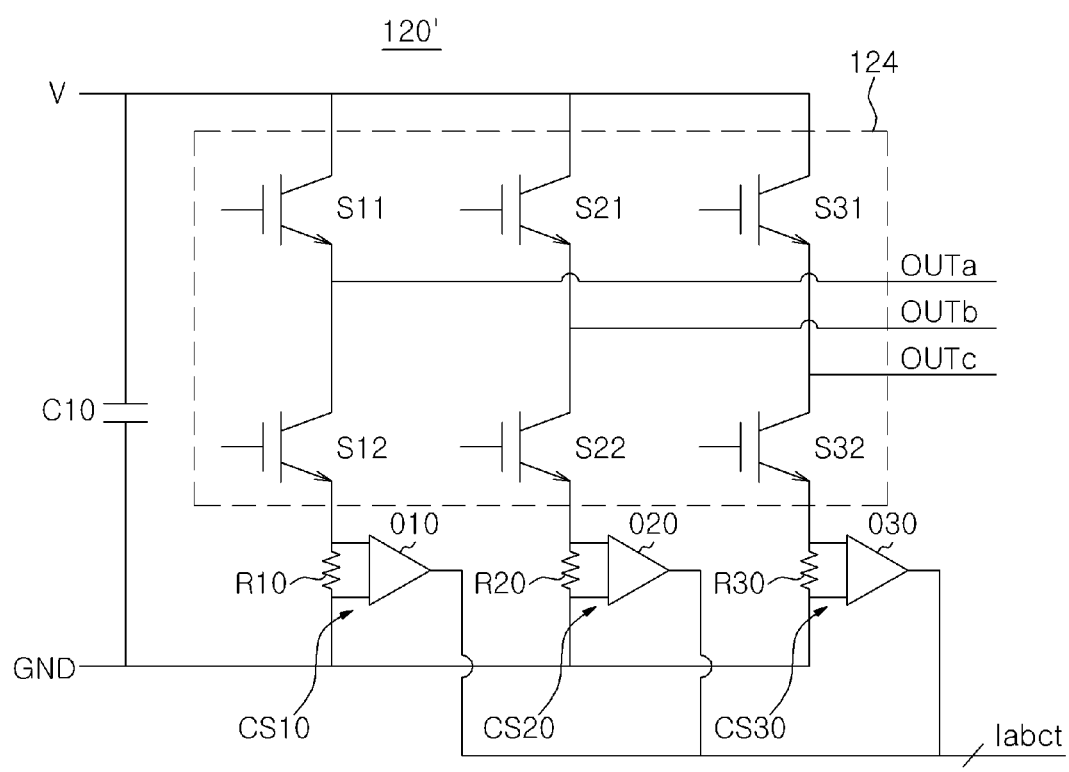
FIG. 18 is a view illustrating an example of a driver included in the power system of FIG. 17.

FIG. 17 is a view illustrating a power system according to another embodiment, and FIG. 18 is a view illustrating an example of a driver included in the power system of FIG. 17.

Referring to FIGS. 17 and 18, a power system 103 may include an electric power supply 110, a driver 120', a first motor 150, a second motor 160, a first current detector 130 and a controller 203.

The controller 203 may include a second current calculator 212; a first speed calculator 221; a second speed/position calculator 224; a fixed coordinate converter 231; a rotating coordinate converter 232; a speed controller 240; a q axis current controller 250; a d axis current command generator 260; a d axis current controller 270; a reverse rotating coordinate converter 281; a reverse fixed coordinate converter 282; and a pulse width modulator 290.

A description of the above described configuration will be omitted.

The driver 120' may include a 6 switch inverter 124 and three current sensors (CS10, CS20, and CS30).

When the driver 120' includes the 6 switch inverter 124, the smoothing circuit may include a capacitor (C 10) and the DC power (VDD) and a ground (GND) may be formed on both ends of the capacitor (C 10), as illustrated in FIG. 2.

The 6 switch inverter 124 may include an a-phase output terminal (OUTa), a b-phase output terminal (OUTb) and a c-phase output terminal (OUTc), and the three output terminals (OUTa, OUTb and OUTc) may be connected to an a, b and c-phase input terminals of the first and second motors 150 and 160, respectively.

Three upper switching circuits (S11, S21 and S31) may be provided between the three output terminals (OUTa, OUTb and OUTc) and the DC power (VDD), and three lower switching circuits (S12, S22 and S32) and the three current sensors (CS10, CS20, and CS30) may be provided between the three output terminals (OUTa, OUTb and OUTc) and the ground (GND). In addition, the three lower switching circuits (S12, S22 and S32) and the three current sensors (CS10, CS20, and CS30) may be connected in series, respectively.

The three current sensors (CS10, CS20, and CS30) may respectively include shunt resistances (R10, R20, and R30) converting current flowing the three lower switching circuits (S12, S22 and S32) into voltage, and amplifiers (O10, O20, and O30) detecting a voltage applied to both ends of the shunt resistances (R10, R20, and R30).

The current sensors (CS10, CS20, and CS30) may output a total driving current (Iabct) by detecting current flowing in the three lower switching circuits (S12, S22 and S32).

The driver 120' including the current sensors (CS10, CS20, and CS30) may detect a total current supplied to the first and second motors 150 and 160 using the shunt resistances (R10, R20, and R30) and the amplifiers (O10, O20, and O30) both of which has a relatively low price, instead of using a converter and an ammeter both of which has a relatively high price.

FIG. 18 illustrates the driver 120' including three current sensors (CS10, CS20, and CS30), but the driver 120' is not limited thereto. For example, the driver 120' may include a single current sensor detecting current flowing in the ground (GND).

In comparison with the power system 102 of FIGS. 15 and 16, the power system 103 of FIGS. 17 and 18 may exclude the total current detector 190, but include the driver 120' including the current sensors (CS10, CS20, and CS30) to detect the total driving current (Iabct).

The controller 203 may include a configuration which is the same as the controller 202 of the power system 102 illustrated in FIGS. 15 and 16.

In addition, in comparison with the power system 100 as illustrated in FIGS. 1 to 11, the power system 100 as illustrated in FIG. 1 may detect the location θ2 of the rotor of the second motor 160 using the second position detector 180, but the power system 103 as illustrated in FIG. 17 may detect the location θ2 of the rotor of the second motor 160 using the driver 120' including the current sensors (CS10, CS20, and CS30), the second current calculator 212, and the second speed/position calculator 224.

Accordingly, the power system 100 as illustrated in FIG. 1 may detect the location θ1 and θ2 of the rotor included in the first and second motors 150 and 160 using the sensor, e.g. a hall sensor, and the power system 103 as illustrated in FIG. 17 may detect the location θ1 of the rotor of the first motor 150 using the sensor and detect the location θ2 of the rotor of the second motor 160 using the second driving current (Iabc2) of the second motor 160 without the sensor.

Figure 19:
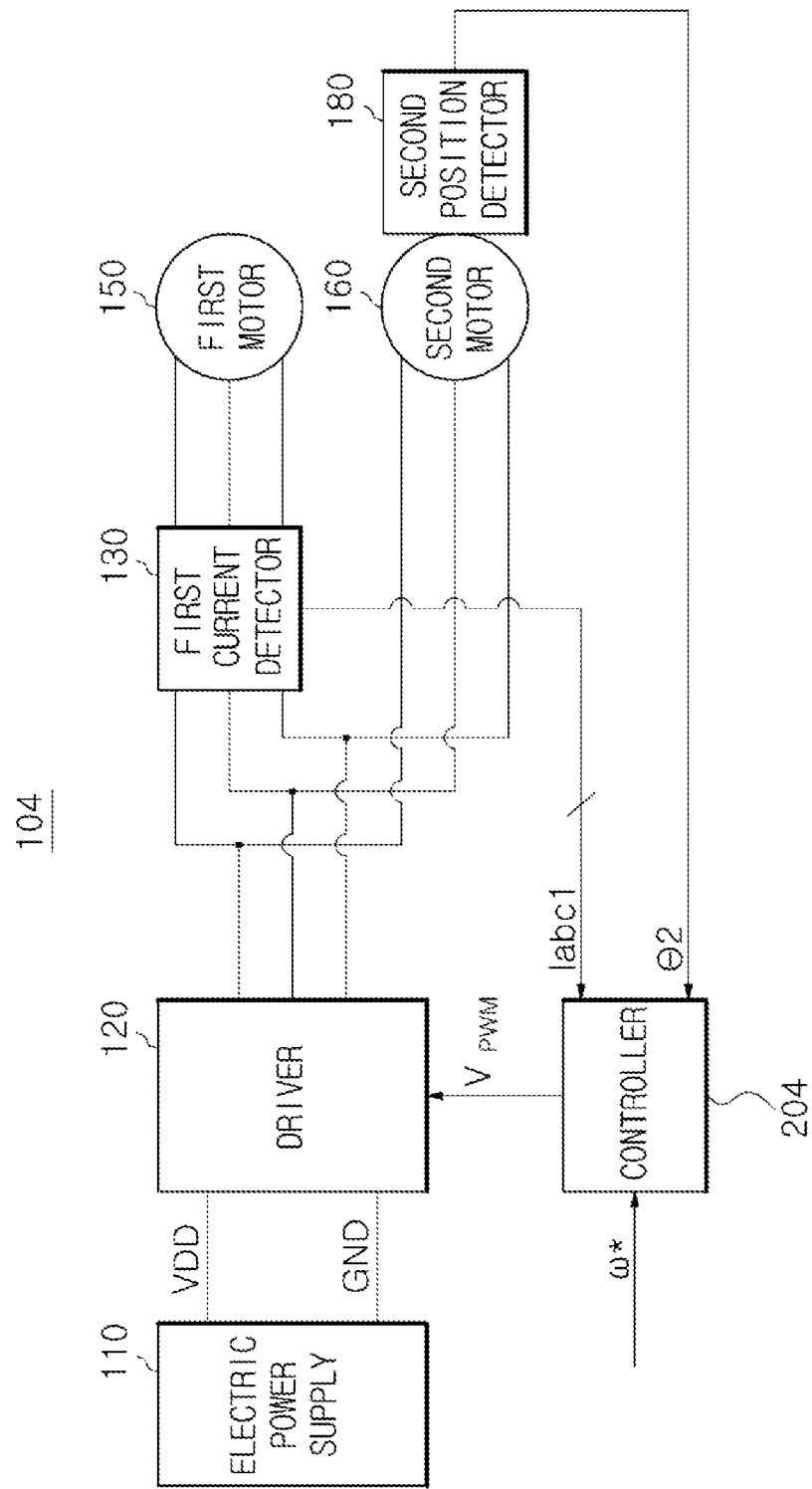
FIG. 19 is a view illustrating a power system according to another embodiment.
Figure 20:
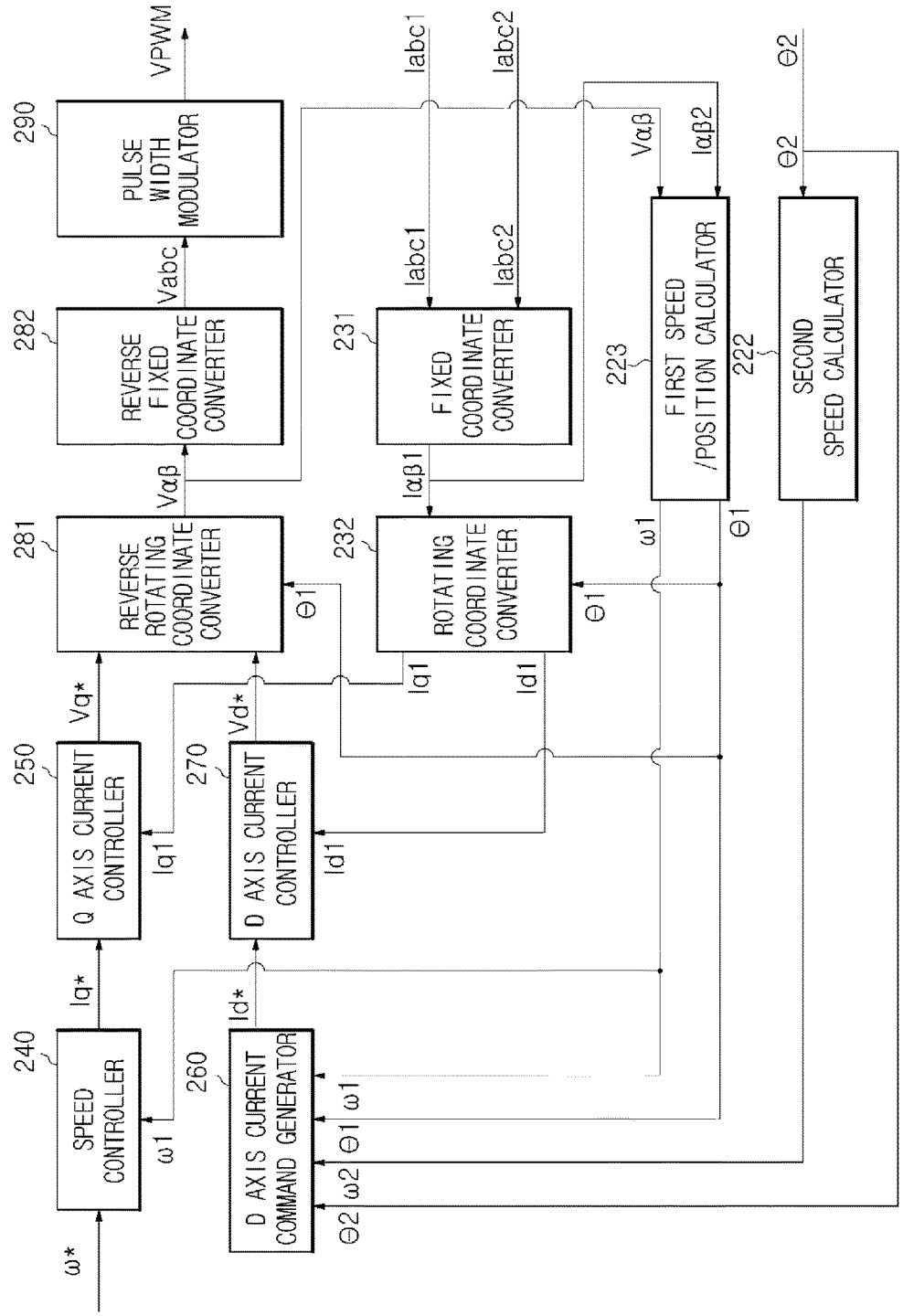
FIG. 20 is a view illustrating an example of a controller included in the power system of FIG. 19.

FIG. 19 is a view illustrating a power system according to another embodiment, and FIG. 20 is a view illustrating an example of a controller included in the power system of FIG. 19.

Referring to FIGS. 19 and 20, a power system 104 may include an electric power supply 110, a driver 120, a first motor 150, a second motor 160, a first current detector 130, a second position detector 180 and a controller 204.

The controller 204 may include a first speed/position calculator 223; a second speed calculator 222; a fixed coordinate converter 231; a rotating coordinate converter 232; a speed controller 240; a q axis current controller 250; a d axis current command generator 260; a d axis current controller 270; a reverse rotating coordinate converter 281; a reverse fixed coordinate converter 282; and a pulse width modulator 290.

A description of the above described configuration will be omitted.

The first speed/position calculator 223 may calculate a rotating speed ω1 of the first motor 150 and a location θ1 of the rotor of the first motor 150 based on a first α axis and β axis current (Iαβ1) in the fixed vector coordinate system and an α axis and β axis voltage (Vαβ) in the fixed vector coordinate system.

Particularly, the first speed/position calculator 223 may estimate a counter electromotive force of the first motor 150 using a motor model using the first α axis and β axis current (Iαβ1) in the fixed vector coordinate system and the α axis and β axis voltage (Vαβ) in the fixed vector coordinate system. Since a driving voltage applied to the motor is equal to a sum of a voltage drop due to the coil of the stator and the counter electromotive force, the first speed/position calculator 223 may estimate the counter electromotive force using the α axis and β axis voltage and the α axis and β axis current.

The first speed/position calculator 223 may calculate a rotating speed ω1 of the first motor 150 based on the estimated counter electromotive force, and estimate a location θ1 of the rotor of the first motor 150 by integrating the rotating speed ω1 of the first motor 150 by a time.

Although not shown in FIG. 20, in order to more accurately estimate the rotating speed ω1 of the first motor 150, the first speed/position calculator 223 may receive a feedback of the rotating speed ω1 of the first motor 150.

When comparing FIGS. 1 to 11 with FIGS. 19 and 20, the first current detector 130 and the first speed calculator 221 may be omitted and the first speed/position calculator 223 may be additionally provided in the power system 104 as illustrated in FIG. 19 in comparison with the power system 100 as illustrated in FIG. 1.

The power system 104 as illustrated in FIG. 19 may detect a first driving current (Iabc1) of the first motor 150 using the first current detector 130, detect the location θ1 of the rotor of the first motor 150 using the first current detector 130 and the first speed/position calculator 223, and detect the location θ2 of the rotor of the second motor 160 using the second position detector 180.

Accordingly, the power system 104 as illustrated in FIG. 19 may detect the location θ1 of the rotor of the first motor 150 using the second driving current (Iabc2) of the second motor 160 without the sensor, and detect the location θ2 of the rotor of the second motor 160 using the sensor.

Figure 21:
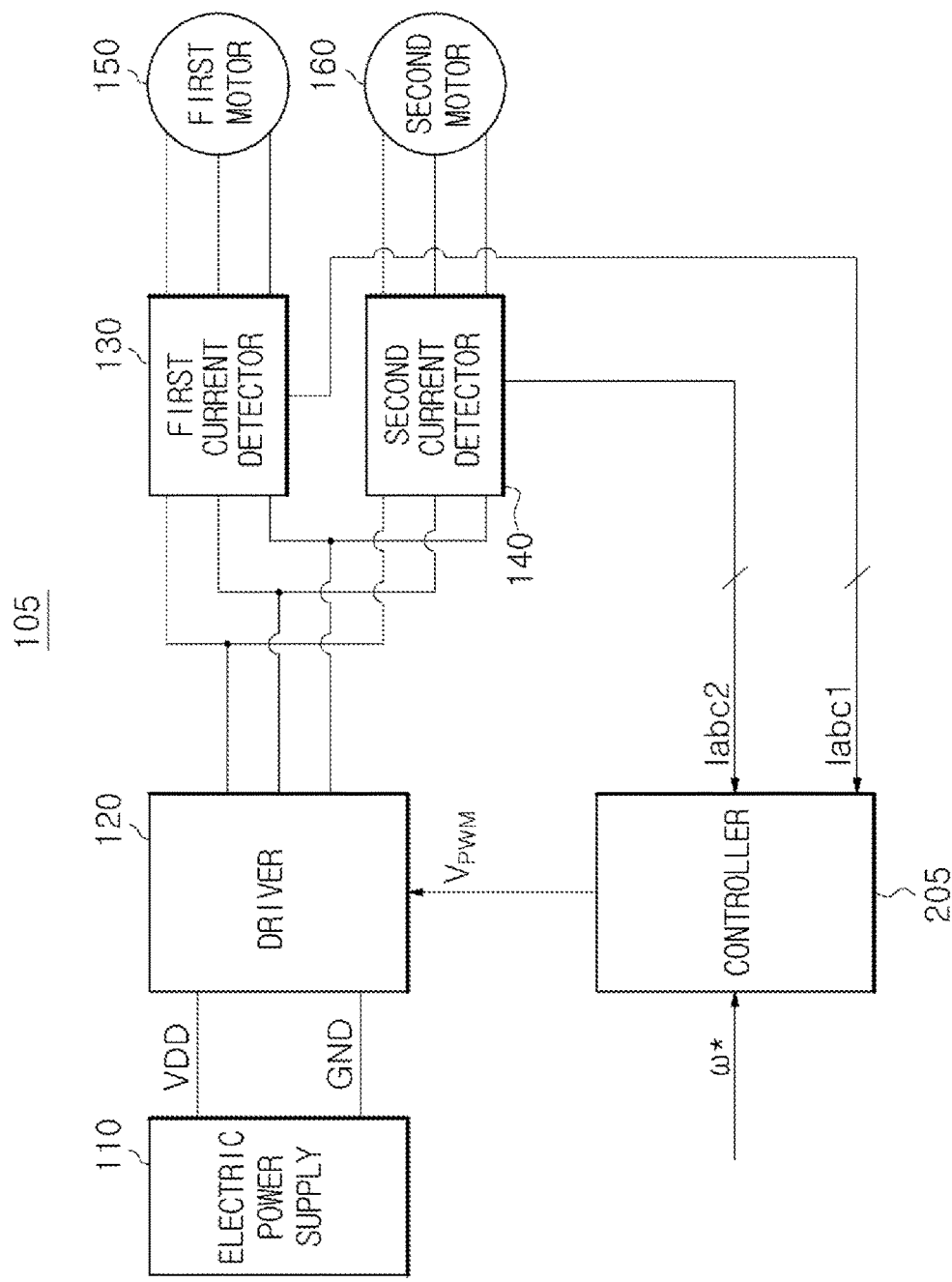
FIG. 21 is a view illustrating a power system according to another embodiment.
Figure 22:
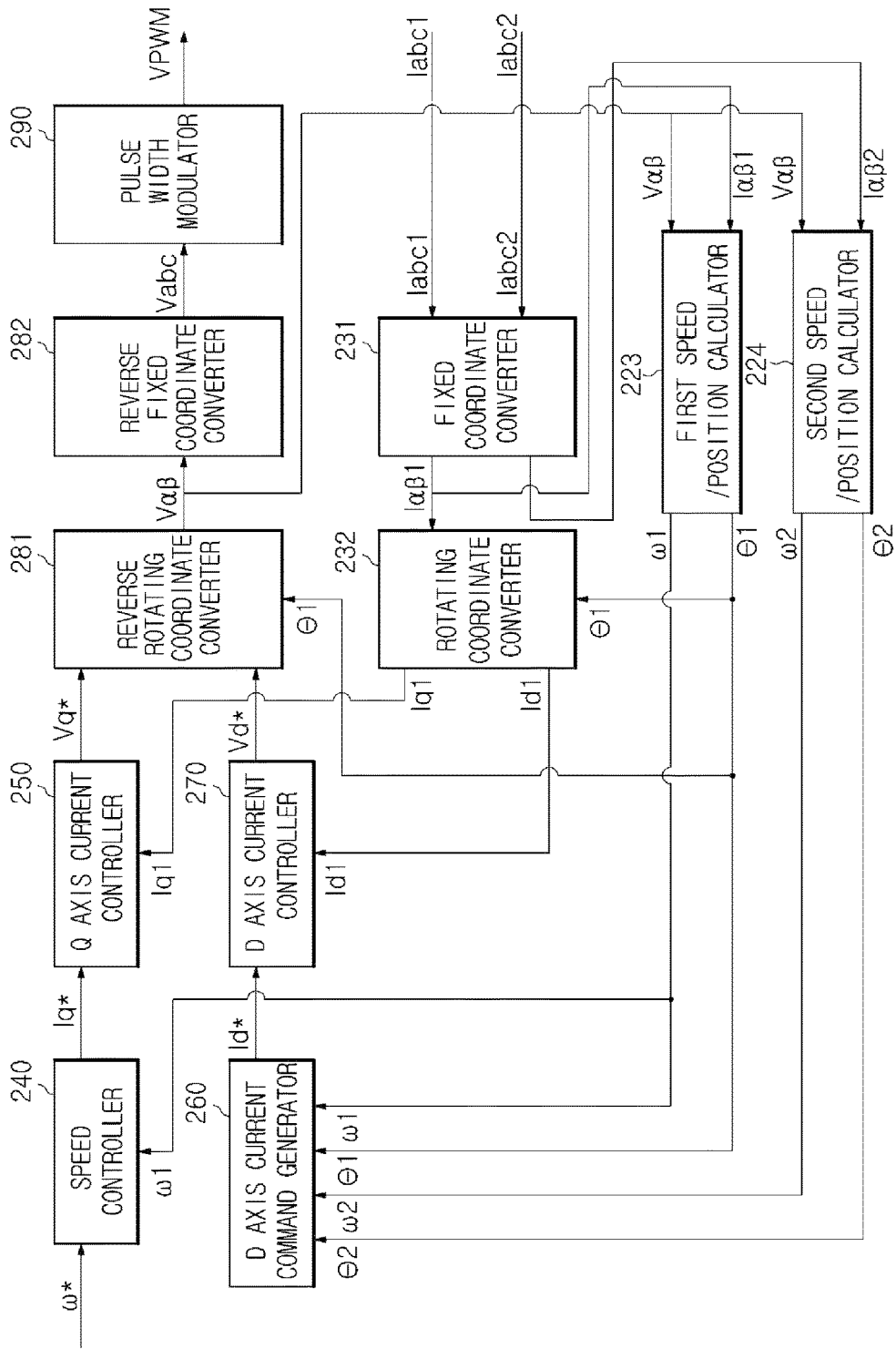
FIG. 22 is a view illustrating an example of a controller included in the power system of FIG. 21.

FIG. 21 is a view illustrating a power system according to another embodiment, and FIG. 22 is a view illustrating an example of a controller included in the power system of FIG. 21.

Referring to FIGS. 21 and 22, a power system 105 may include an electric power supply 110, a driver 120, a first motor 150, a second motor 160, a first current detector 130, a second current detector 140 and a controller 205.

The controller 205 may include a first speed/position calculator 223; a second speed/position calculator 224; a fixed coordinate converter 231; a rotating coordinate converter 232; a speed controller 240; a q axis current controller 250; a d axis current command generator 260; a d axis current controller 270; a reverse rotating coordinate converter 281; a reverse fixed coordinate converter 282; and a pulse width modulator 290.

When comparing FIGS. 1 to 11 with FIGS. 21 and 22, the first current detector 130, the first speed calculator 221, the second position detector 180 and the second speed calculator 222 may be omitted and the first speed/position calculator 223, the second current detector 140, and the second speed/position calculator 224 may be additionally provided in the power system 105 as illustrated in FIG. 21 in comparison with the power system 100 as illustrated in FIG. 1.

The power system 105 as illustrated in FIG. 21 may detect a first driving current (Iabc1) of the first motor 150 using the first current detector 130, detect the location θ1 of the rotor of the first motor 150 using the first current detector 130 and the first speed/position calculator 223, and detect the location θ2 of the rotor of the second motor 160 using the second current detector 140 and the second speed/position calculator 224.

Accordingly, the power system 105 as illustrated in FIG. 21 may detect the location θ1 of the rotor of the first motor 150 and the location θ2 of the rotor of the second motor 160 using the first driving current (Iabc1) of the first motor 150 and the second driving current (Iabc2) of the second motor 160 without the sensor.

Figure 23:
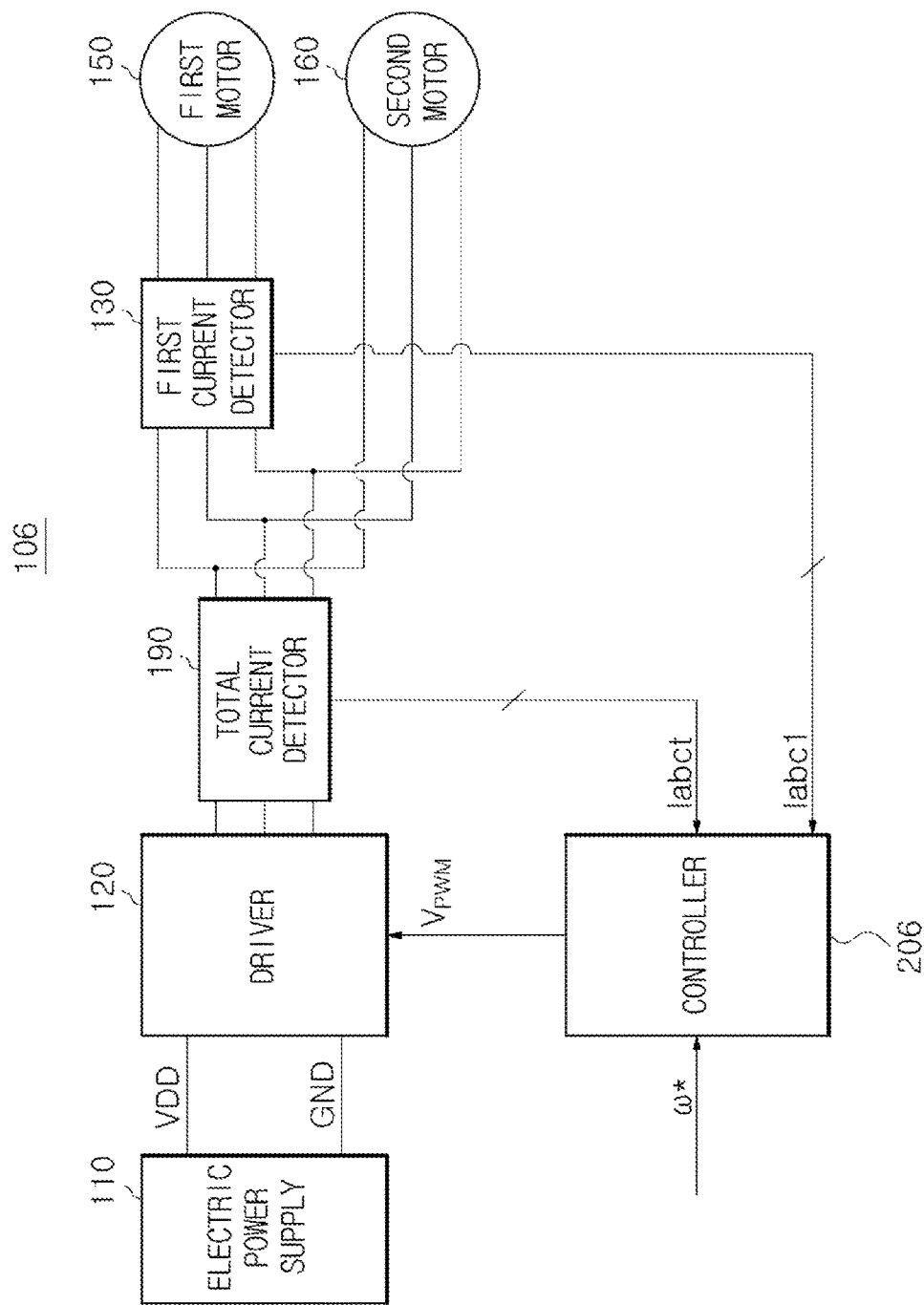
FIG. 23 is a view illustrating a power system according to another embodiment.
Figure 24:
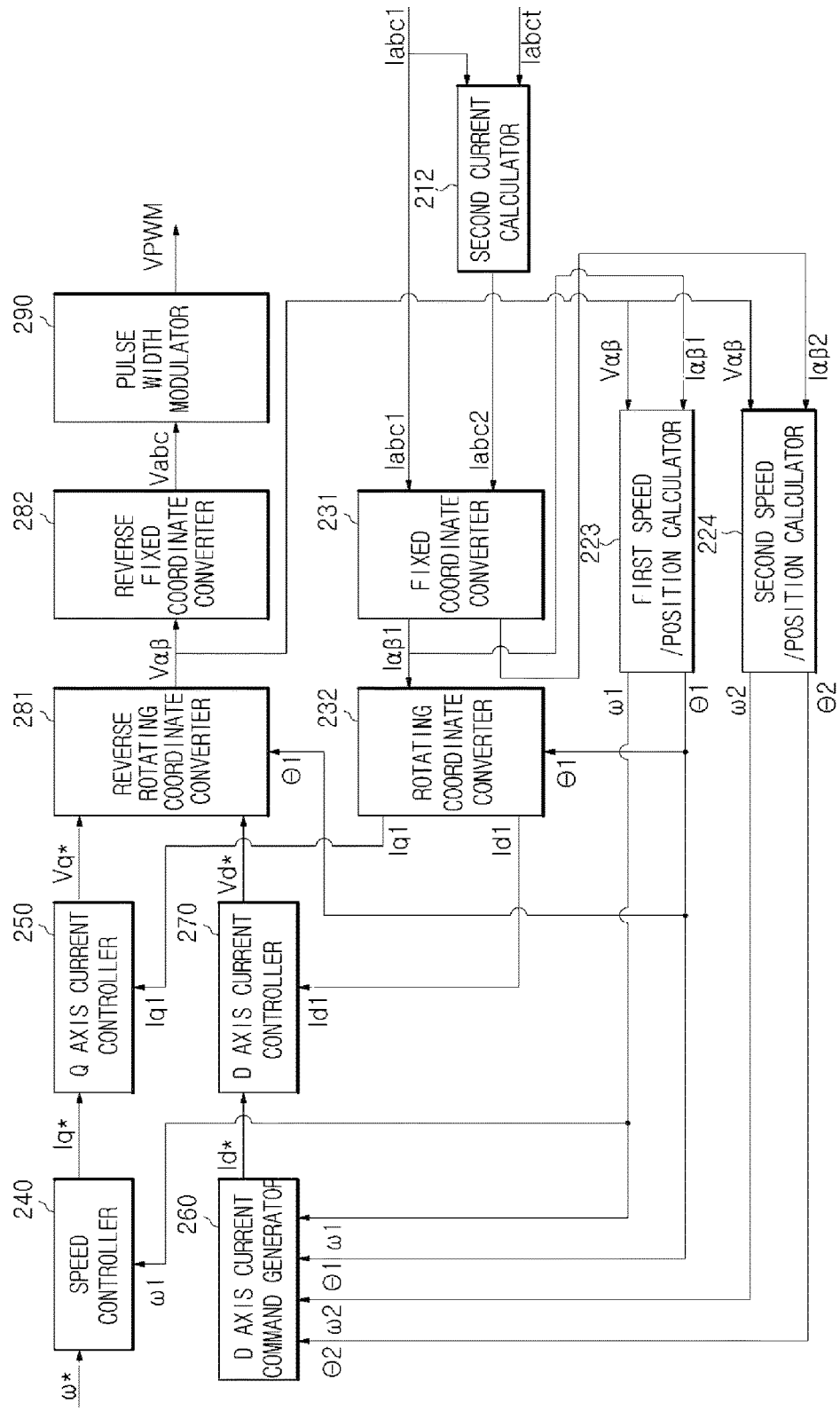
FIG. 24 is a view illustrating an example of a controller included in the power system of FIG. 23.

FIG. 23 is a view illustrating a power system according to another embodiment, and FIG. 24 is a view illustrating an example of a controller included in the power system of FIG. 23.

Referring to FIGS. 23 and 24, a power system 106 may include an electric power supply 110, a driver 120, a first motor 150, a second motor 160, a first current detector 130, a total current detector 190 and a controller 206.

The controller 206 may include a second current calculator 212; a first speed/position calculator 223; a second speed/position calculator 224; a fixed coordinate converter 231; a rotating coordinate converter 232; a speed controller 240; a q axis current controller 250; a d axis current command generator 260; a d axis current controller 270; a reverse rotating coordinate converter 281; a reverse fixed coordinate converter 282; and a pulse width modulator 290.

When comparing FIGS. 23 to 24 with FIGS. 21 and 22, the second current detector 140 may be omitted and the total current detector 190 and the second current calculator 212 may be additionally provided in the power system 106 as illustrated in FIG. 23 in comparison with the power system 105 as illustrated in FIG. 21.

The power system 106 as illustrated in FIG. 23 may detect a first driving current (Iabc1) of the first motor 150 using the first current detector 130, detect the location θ1 of the rotor of the first motor 150 using the first current detector 130 and the first speed/position calculator 223, and detect the location θ2 of the rotor of the second motor 160 using the total current detector 190, the second current calculator 212 and the second speed/position calculator 224.

Accordingly, the power system 106 as illustrated in FIG. 23 may detect the location θ1 of the rotor of the first motor 150 and the location θ2 of the rotor of the second motor 160 using the first driving current (Iabc1) of the first motor 150 and the second driving current (Iabc2) of the second motor 160 without the sensor.

Figure 25:
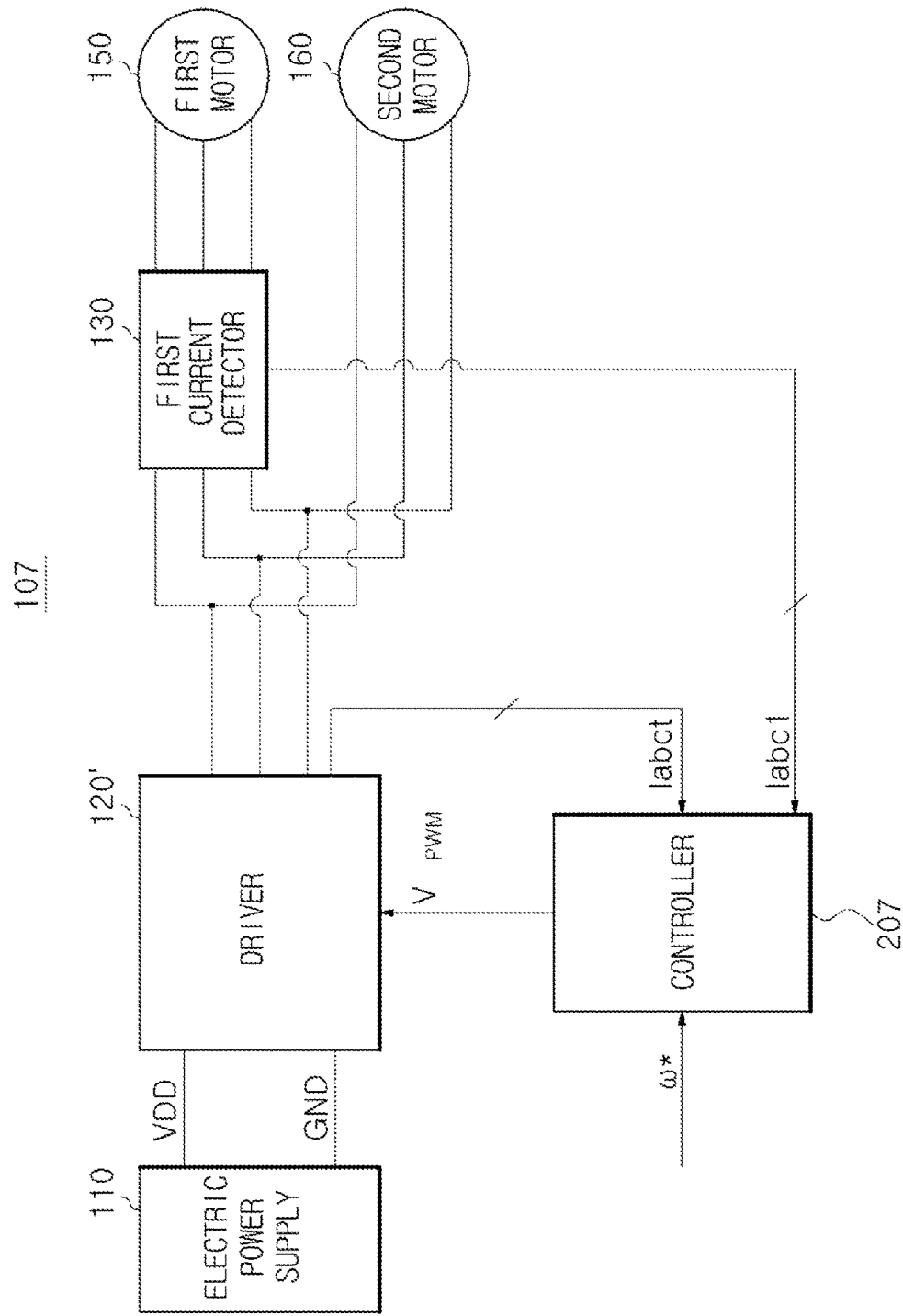
FIG. 25 is a view illustrating a power system according to another embodiment.

FIG. 25 is a view illustrating a power system according to another embodiment.

Referring to FIG. 25, a power system 107 may include an electric power supply 110, a driver 120', a first motor 150, a second motor 160, a first current detector 130 and a controller 207.

The driver 120' may detect an a, b and c-phase driving current, as the same as in the driver 120' of FIG. 18, and the controller 207 may be the same as the controller 206 as illustrated in FIG. 24 (refer to FIG. 24).

That is, the power system 107 as illustrated in FIG. 25 may detect a first driving current (Iabc1) of the first motor 150 using the first current detector 130, detect the location θ1 of the rotor of the first motor 150 using the first current detector 130 and the first speed/position calculator 223, and detect the location θ2 of the rotor of the second motor 160 using the total current detector 190, the second current calculator 212 and the second speed/position calculator 224.

Accordingly, the power system 107 as illustrated in FIG. 25 may detect the location θ1 of the rotor of the first motor 150 and the location θ2 of the rotor of the second motor 160 using the first driving current (Iabc1) of the first motor 150 and the second driving current (Iabc2) of the second motor 160 without the sensor.

Figure 26:
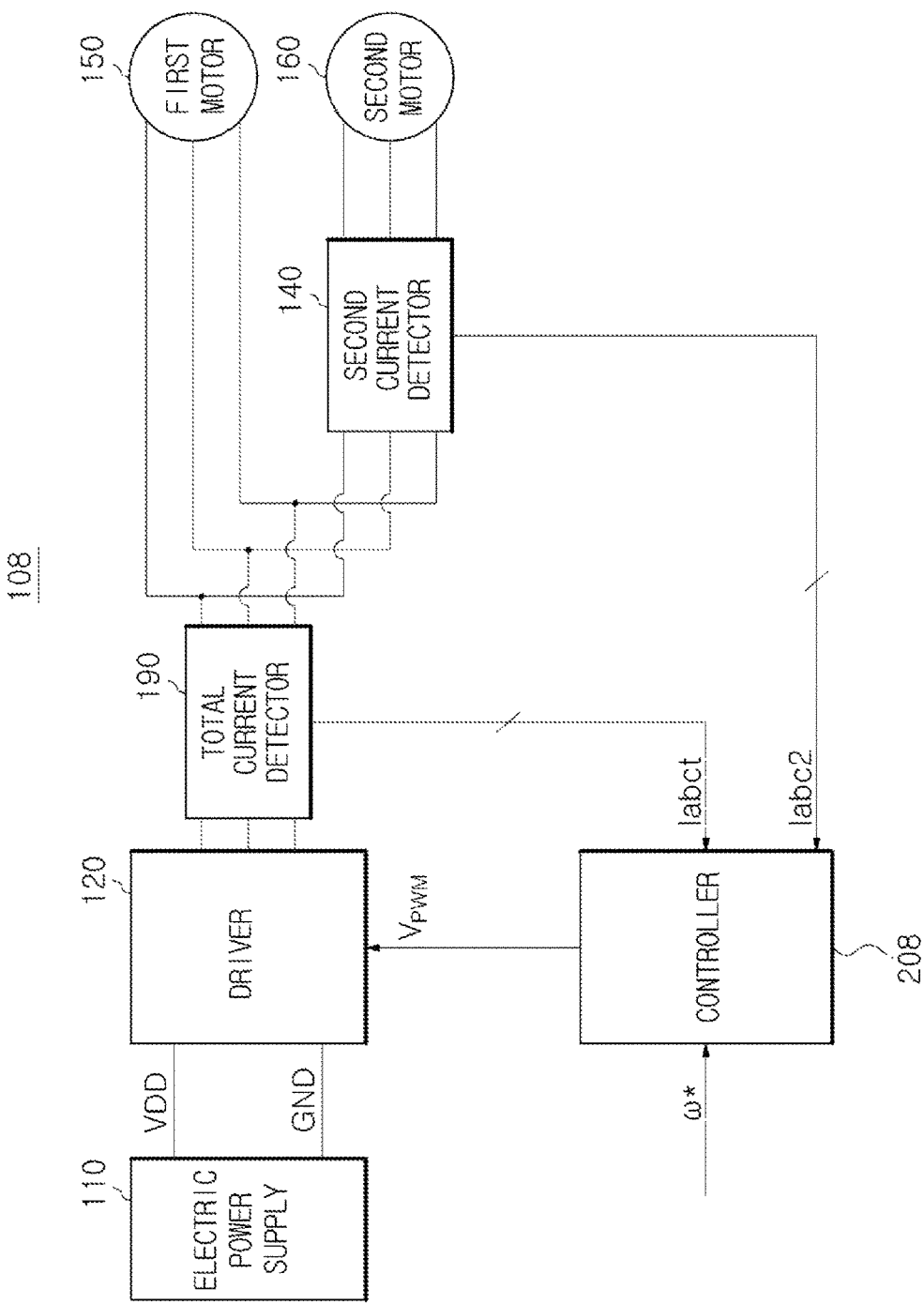
FIG. 26 is a view illustrating a power system according to another embodiment.
Figure 27:
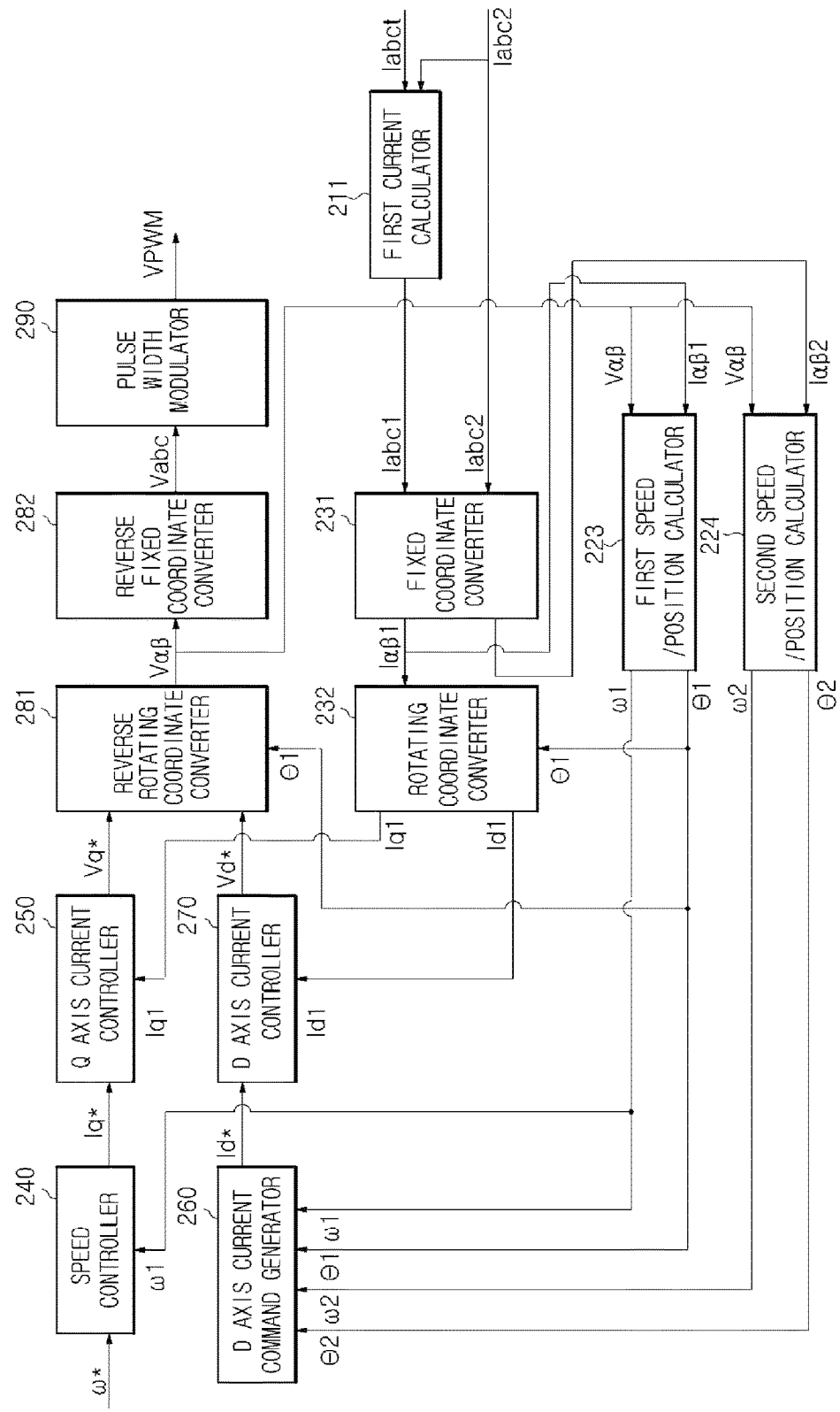
FIG. 27 is a view illustrating an example of a controller included in the power system of FIG. 26.

FIG. 26 is a view illustrating a power system according to another embodiment, and FIG. 27 is a view illustrating an example of a controller included in the power system of FIG. 26.

Referring to FIGS. 26 and 27, a power system 108 may include an electric power supply 110, a driver 120, a first motor 150, a second motor 160, a second current detector 140, a total current detector 190 and a controller 208.

The controller 208 may include a first current calculator 211; a first speed/position calculator 223; a second speed/position calculator 224; a fixed coordinate converter 231; a rotating coordinate converter 232; a speed controller 240; a q axis current controller 250; a d axis current command generator 260; a d axis current controller 270; a reverse rotating coordinate converter 281; a reverse fixed coordinate converter 282; and a pulse width modulator 290.

When comparing FIGS. 26 and 27 with FIGS. 21 and 22, the first current detector 130 may be omitted and the total current detector 190 and the first current calculator 211 may be additionally provided in the power system 108 as illustrated in FIG. 26 in comparison with the power system 105 as illustrated in FIG. 21.

The power system 108 as illustrated in FIG. 26 may detect a first driving current (Iabc1) of the first motor 150 using the total current detector 190 and the first current calculator 211, detect the location θ1 of the rotor of the first motor 150 using the first current detector 130 and the first speed/position calculator 223, and detect the location θ2 of the rotor of in the second motor 160 using the total current detector 190, the second current calculator 212 and the second speed/position calculator 224.

Accordingly, the power system 108 as illustrated in FIG. 26 may detect the location θ1 of the rotor of the first motor 150 and the location θ2 of the rotor of the second motor 160 using the first driving current (Iabc1) of the first motor 150 and the second driving current (Iabc2) of the second motor 160 without the sensor.

Figure 28:
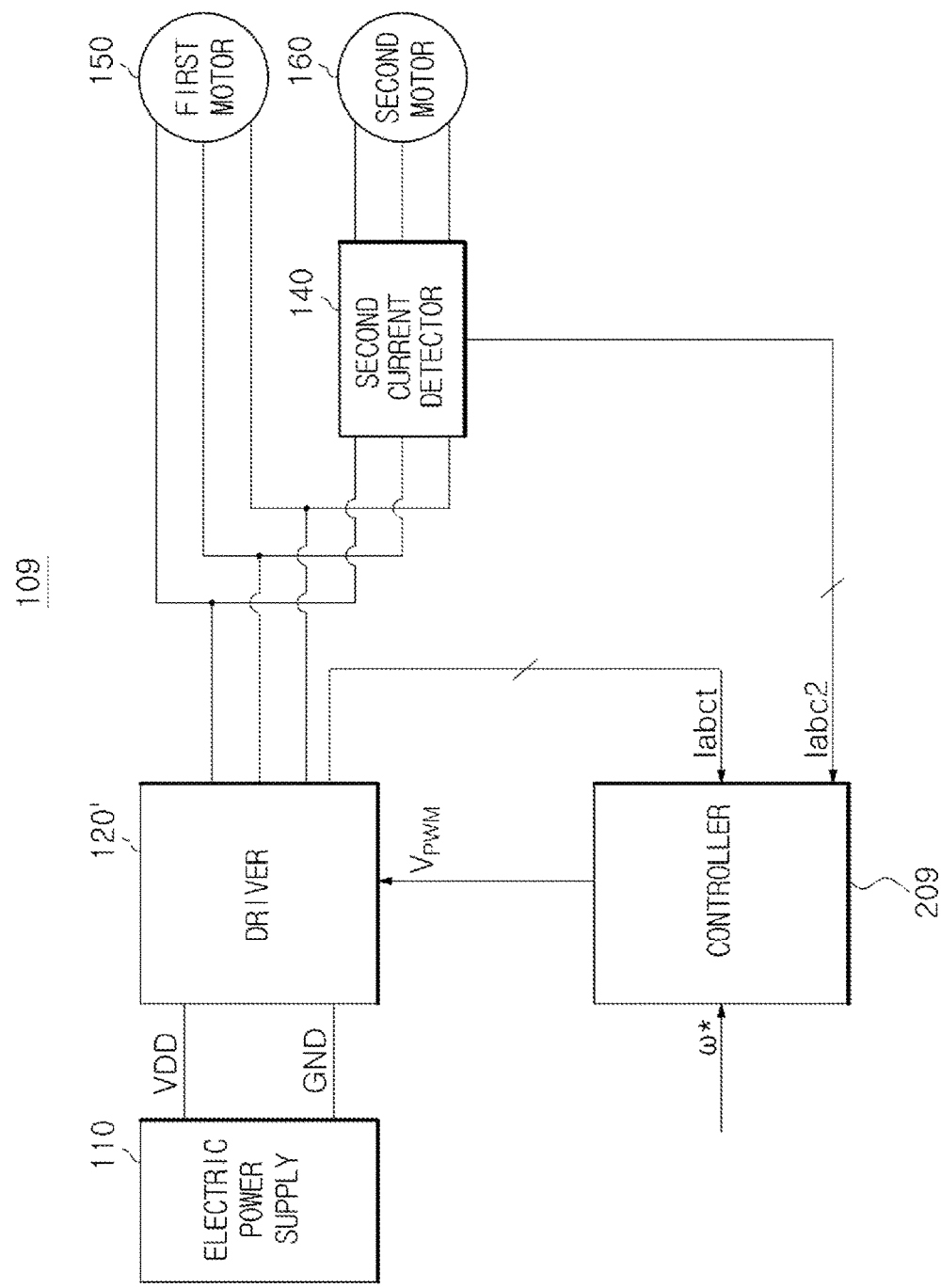
FIG. 28 is a view illustrating a power system according to another embodiment.

FIG. 28 is a view illustrating a power system according to another embodiment.

Referring to FIG. 28, a power system 109 may include an electric power supply 110, a driver 120', a first motor 150, a second motor 160, a first current detector 130 and a controller 209.

The driver 120' may detect an a, b and c-phase driving current, as the same as in the driver 120' of FIG. 18, and the controller 209 may be the same as the controller 208 as illustrated in FIG. 27 (refer to FIG. 27).

That is, the power system 109 as illustrated in FIG. 28 may detect a first driving current (Iabc1) of the first motor 150 using the total current detector 190 and the first current calculator 211, detect the location θ1 of the rotor of the first motor 150 using the total current detector 190, the first current calculator 211 and the first speed/position calculator 223, and detect the location θ2 of the rotor of the second motor 160 using the second current detector 140 and the second speed/position calculator 224.

Accordingly, the power system 109 as illustrated in FIG. 28 may the location θ1 of the rotor of the first motor 150 and the location θ2 of the rotor of the second motor 160 using the first driving current (Iabc1) of the first motor 150 and the second driving current (Iabc2) of the second motor 160 without the sensor.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A power system comprising:
a first motor;
a second motor connected in parallel to the first motor;
a driver configured to supply a driving current to the first motor and the second motor;
a first current detector configured to detect the driving current to the first motor;
a second current detector configured to detect the driving current of the second motor; and
a controller configured to:
control the driver based on the driving current and a rotating speed of the first motor, and
when the rotating speed of the second motor is different than a rotating speed of the first motor, control the driver based on the rotating speed of the first motor and a difference between the rotating speed of the first motor and the rotating speed of the second motor so that the rotating speed of the first motor is equal to the rotating speed of the second motor.

2. The power system of claim 1, wherein the controller is further configured to estimate the rotating speed of the second motor based on the driving current of the second motor.

3. A power system comprising:
a first motor;
a second motor connected in parallel to the first motor;
a driver configured to supply a driving current to the first motor and the second motor;
a first current detector configured to detect the driving current to the first motor;
a total current detector configured to detect a total driving current that is supplied by the driver; and
a controller configured to:
control the driver based on the driving current and a rotating speed of the first motor, and
when the rotating speed of the second motor is different than a rotating speed of the first motor, control the driver based on the rotating speed of the first motor and a difference between the rotating speed of the first motor and the rotating speed of the second motor so that the rotating speed of the first motor is equal to the rotating speed of the second motor.

4. The power system of claim 3, wherein the controller is further configured to estimate the rotating speed of the second motor based on the driving current of the first motor and the total driving current.

5. A power system comprising:
a first motor;
a second motor connected in parallel to the first motor;
a driver configured to supply a driving current to the first motor and the second motor;
a total current detector configured to detect a total driving current that is supplied by the driver;
a second current detector configured to detect a driving current of the second motor; and
a controller configured to:
control the driver based on the driving current and a rotating speed of the first motor, and
when the rotating speed of the second motor is different than a rotating speed of the first motor, control the driver based on the rotating speed of the first motor and a difference between the rotating speed of the first motor and the rotating speed of the second motor so that the rotating speed of the first motor is equal to the rotating speed of the second motor.

6. The power system of claim 5, wherein the controller is further configured to estimate the driving current of the first motor based on the driving current of the second motor and the total driving current.

7. The power system of claim 6, wherein the controller is further configured to estimate the rotating speed of the first motor based on the driving current of the first motor.

8. The power system of claim 5, wherein the controller is further configured to estimate the rotating speed of the second motor based on the driving current of the second motor.

9. A motor driving apparatus comprising:
a driver configured to supply a driving current to a first motor and a second motor connected in parallel to each other;
a first current detector configured to detect the driving current of the first motor;
a second current detector configured to detect the driving current of the second motor; and
a controller configured to:
control the driver based on the driving current and a rotating speed of the first motor, and
when the rotating speed of the second motor is different from a rotating speed of the first motor, control the driver based on the rotating speed of the first motor and a difference between the rotating speed of the first motor and the rotating speed of the second motor so that the rotating speed of the first motor is equal to the rotating speed of the second motor.

10. A motor driving apparatus comprising:
a driver configured to supply a driving current to a first motor and a second motor connected in parallel to each other;
a first current detector configured to detect the driving current of the first motor;
a total current detector configured to detect a total driving current supplied by the driver; and
a controller configured to:
control the driver based on the driving current and a rotating speed of the first motor, and
when the rotating speed of the second motor is different from a rotating speed of the first motor, control the driver based on the rotating speed of the first motor and a difference between the rotating speed of the first motor and the rotating speed of the second motor so that the rotating speed of the first motor is equal to the rotating speed of the second motor.

11. A motor driving apparatus comprising:
a driver configured to supply a driving current to a first motor and a second motor connected in parallel to each other;
a total current detector configured to detect a total driving current supplied by the driver;
a second current detector configured to detect the driving current of the second motor; and
a controller configured to:
control the driver based on the driving current and a rotating speed of the first motor,
when the rotating speed of the second motor is different from a rotating speed of the first motor, control the driver based on the rotating speed of the first motor and a difference between the rotating speed of the first motor and the rotating speed of the second motor so that the rotating speed of the first motor is equal to the rotating speed of the second motor, and
estimate the driving current of the first motor based on the driving current of the second motor and the total driving current.

12. The motor driving apparatus of claim 11, wherein the controller is further configured to estimate the rotating speed of the first motor based on the driving current of the first motor.

13. The motor driving apparatus of claim 11, wherein the controller is further configured to estimate the rotating speed of the second motor based on the driving current of the second motor.

* * * * *